(12) United States Patent
Chou

(10) Patent No.: US 12,189,147 B2
(45) Date of Patent: *Jan. 7, 2025

(54) IMAGING LENS ASSEMBLY WITH DUAL MOLDED OPTICAL ELEMENT AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,185

(22) Filed: May 9, 2023

(65) Prior Publication Data

US 2023/0273351 A1    Aug. 31, 2023

Related U.S. Application Data

(63) Continuation of application No. 17/151,238, filed on Jan. 18, 2021, now Pat. No. 11,681,082, which is a
(Continued)

(30) Foreign Application Priority Data

Jan. 30, 2018    (TW) ................................ 107103303

(51) Int. Cl.
*G02B 5/00*    (2006.01)
*B29D 11/00*    (2006.01)
(Continued)

(52) U.S. Cl.
CPC ........ *G02B 5/003* (2013.01); *B29D 11/00403* (2013.01); *G02B 7/021* (2013.01); *G02B 13/004* (2013.01); *G02B 13/0045* (2013.01)

(58) Field of Classification Search
CPC .......... G02B 5/003; G02B 5/005; G02B 7/02; G02B 7/021; G02B 7/022; G02B 7/025;
(Continued)

(56) References Cited

U.S. PATENT DOCUMENTS 7,457,052 B2    11/2008 Hirata
7,468,848 B2    12/2008 Shimizu et al.
(Continued)

FOREIGN PATENT DOCUMENTS

CN    107229109 A    10/2017
CN    107357025 A    11/2017
(Continued)

*Primary Examiner* — Marin Pichler
(74) *Attorney, Agent, or Firm* — McClure, Qualey & Rodack, LLP

(57) ABSTRACT

An imaging lens assembly includes a dual molded optical element, a plurality of imaging lens elements and a light blocking element. The dual molded optical element has an object-side surface and an image-side surface and includes a light transmitting portion and a light absorbing portion. The light transmitting portion includes an optical effective section. The light absorbing portion is located on at least one of the object-side surface and the image-side surface of the dual molded optical element, and a plastic material of the light absorbing portion and a plastic material of the light transmitting portion are different colors. The imaging lens elements are disposed in the inner space of the imaging lens assembly. The light blocking element is disposed adjacent to the light transmitting portion of the dual molded optical element.

26 Claims, 23 Drawing Sheets

Related U.S. Application Data continuation of application No. 16/104,229, filed on Aug. 17, 2018, now Pat. No. 10,928,560.

(51) Int. Cl.
*G02B 7/02* (2021.01)
*G02B 13/00* (2006.01)

(58) Field of Classification Search
CPC .. G02B 13/004; G02B 13/0045; G02B 7/026; G02B 7/00; B29D 11/00403; B29L 2012/00; B29L 2011/0016; B29C 2045/1637; B29C 45/0062; B29C 45/1675; B29C 2045/0089
USPC ................................ 359/819, 821, 738–740
See application file for complete search history.

(56) References Cited

U.S. PATENT DOCUMENTS

| | | | |
|---|---|---|---|
| 8,455,810 B2 | 6/2013 | Tomioka et al. |
| 8,817,396 B2 | 8/2014 | Mori et al. |
| 8,964,313 B2 | 2/2015 | Kobayashi et al. |
| 8,964,314 B2 | 2/2015 | Koike et al. |
| 8,982,486 B2 | 3/2015 | Mori et al. |
| 9,151,925 B2 | 10/2015 | Akutsu et al. |
| 9,158,037 B2 | 10/2015 | Otsuka et al. |
| 9,329,355 B2 | 5/2016 | Lyu |
| 9,465,184 B2 | 10/2016 | Yan et al. |
| 9,726,846 B2 | 8/2017 | Bone |
| 9,746,634 B2 | 8/2017 | Wei et al. |
| 9,746,635 B2 | 8/2017 | Wei et al. |
| 9,759,886 B2 | 9/2017 | Wei et al. |
| 2012/0224267 A1 | 9/2012 | Kikuchi et al. |
| 2014/0334019 A1 | 11/2014 | Shiguri et al. |
| 2014/0347752 A1 | 11/2014 | Koike et al. |
| 2015/0103407 A1 | 4/2015 | Chen |
| 2016/0313472 A1 | 10/2016 | Huang et al. |
| 2017/0322394 A1 | 11/2017 | Chou et al. |

FOREIGN PATENT DOCUMENTS

| | | |
|---|---|---|
| JP | 2005084328 A | 3/2005 |
| JP | 2007233194 A | 9/2007 |
| JP | 2008122801 A | 5/2008 |

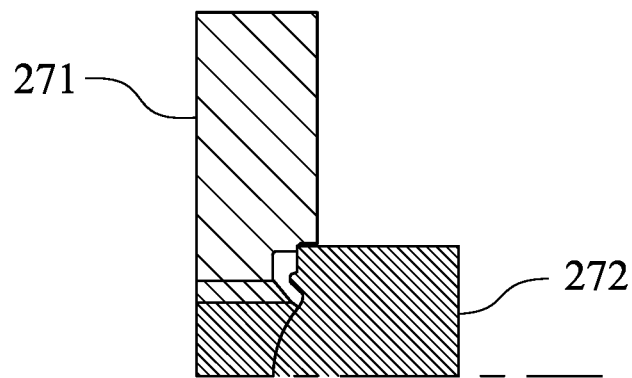
Fig. 2C(1)
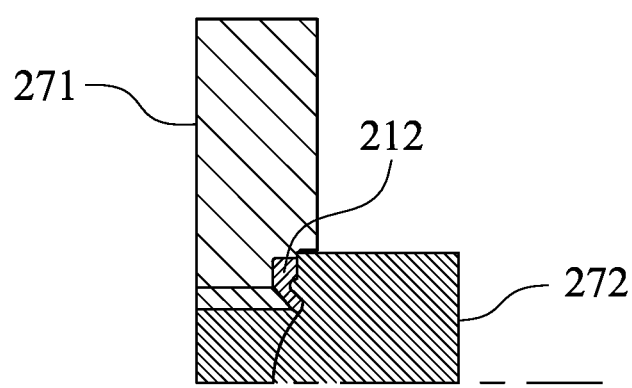
Fig. 2C(2)

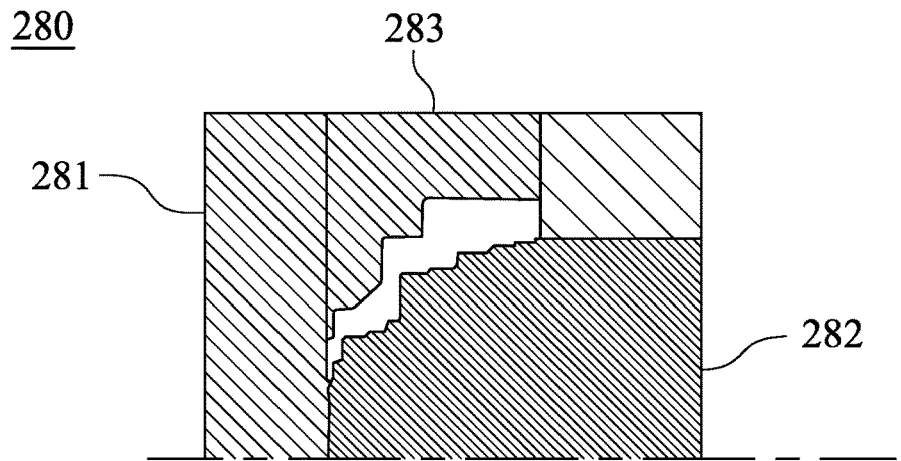
Fig. 2C(3)
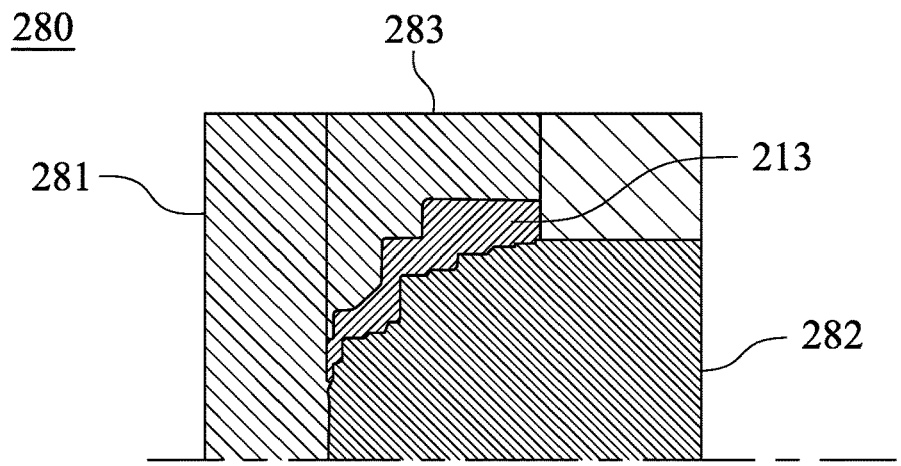
Fig. 2C(4)
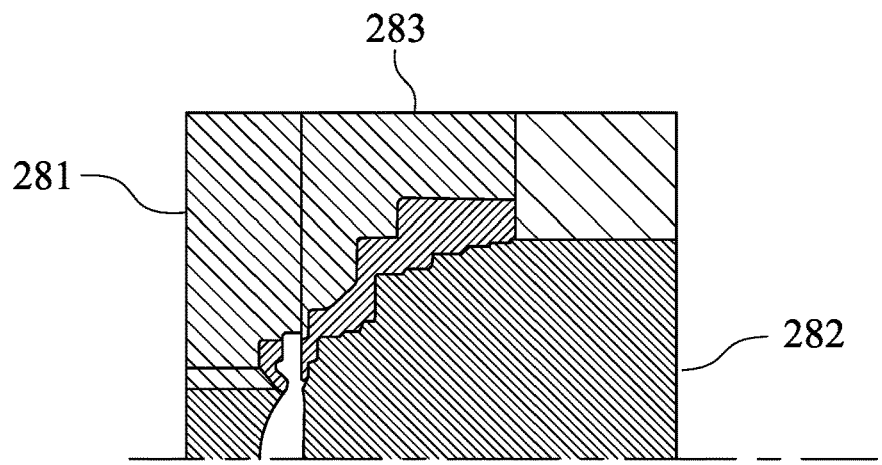
Fig. 2C(5)

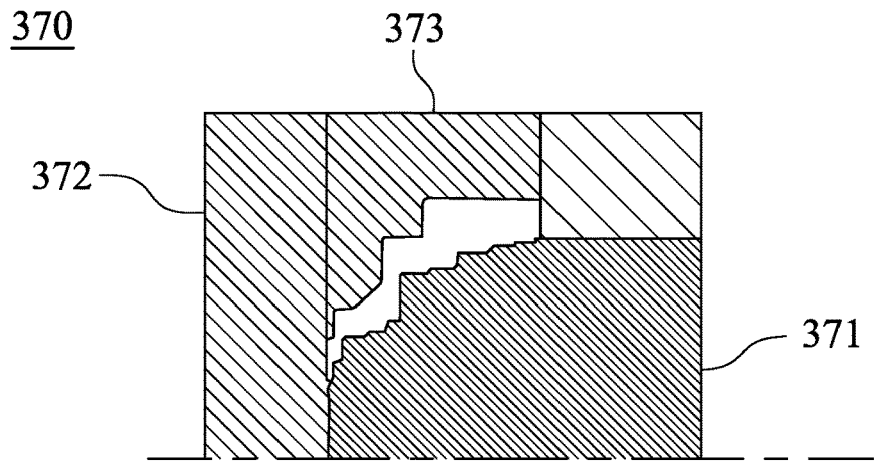
Fig. 3C(1)
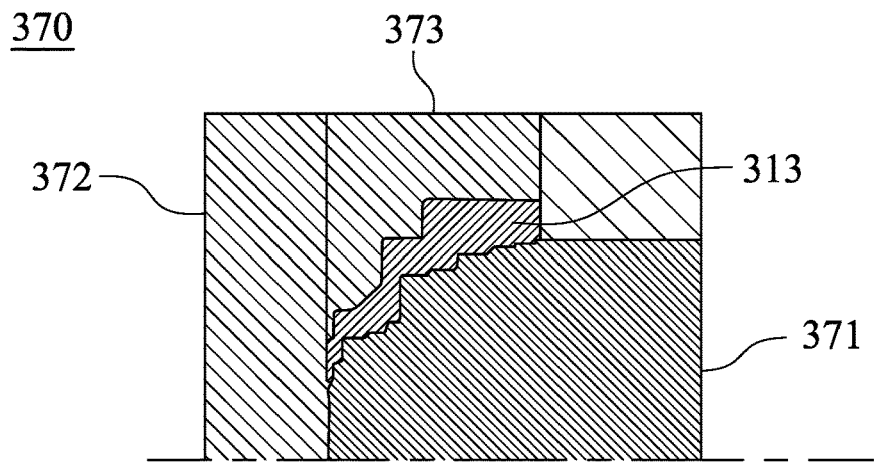
Fig. 3C(2)
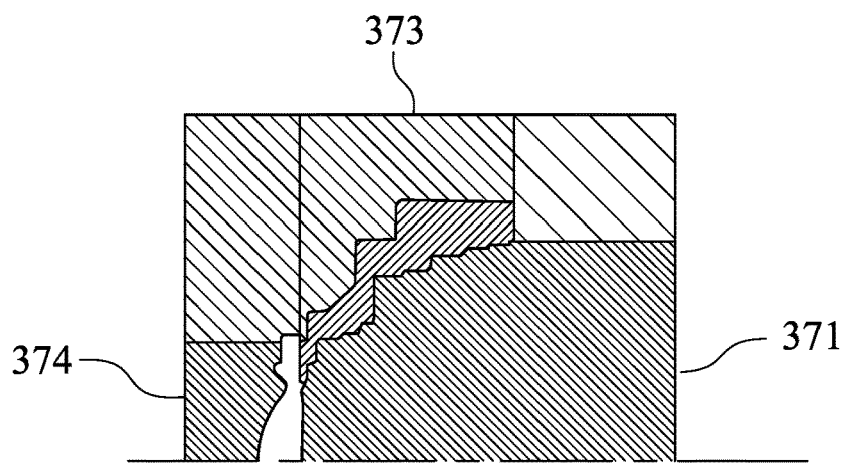
Fig. 3C(3)

IMAGING LENS ASSEMBLY WITH DUAL MOLDED OPTICAL ELEMENT AND ELECTRONIC DEVICE

RELATED APPLICATIONS

The present application is a continuation of U.S. application Ser. No. 17/151,238, filed Jan. 18, 2021, U.S. Pat. No. 11,681,082 issued on Jun. 20, 2023, which is a continuation of U.S. application Ser. No. 16/104,229, filed Aug. 17, 2018, U.S. Pat. No. 10,928,560 issued on Feb. 23, 2021, which claims priority to Taiwan Application Serial Number 107103303, filed Jan. 30, 2018, which is herein incorporated by reference.

BACKGROUND

Technical Field

The present disclosure relates to an imaging lens assembly. In particular, the present disclosure relates to an imaging lens assembly applied to a portable electronic device.

Description of Related Art

In recent years, due to portable electronic devices are developed quickly, such as smart electronic devices and tablets, etc., can be found throughout modern people's whole lives, and the imaging lens assemblies applied to portable electronic devices have also flourished. However, as technologies become more and more advanced, quality demands from users for imaging lens assembly also become higher and higher. Therefore, in addition to optical arrangement quality, the precision of manufacturing and assembling of the imaging lens assembly also needs to be improved.

The optical effective sections of the barrel and the lens elements thereof of the imaging lens assembly are usually assembled of different elements, but the assembly process of the imaging lens assembly is easily affected by the assembling tolerance so as to reduce the image quality of the imaging lens assembly. Furthermore, if light blocking elements are disposed on the object side of the imaging lens assembly, the overall size of the imaging lens assembly will become excessive large easily. Thus, the size of the imaging lens assembly cannot be reduced effectively, and it is hard for the imaging lens assembly applied to the miniaturized electronic devices.

SUMMARY

According to one aspect of the present disclosure, an imaging lens assembly includes a dual molded optical element, a plurality of imaging lens elements and a light blocking element. The dual molded optical element has an object-side surface and an image-side surface and includes a light transmitting portion and a light absorbing portion. The light transmitting portion includes an optical effective section. The light absorbing portion is located on at least one of the object-side surface and the image-side surface of the dual molded optical element, and a plastic material of the light absorbing portion and a plastic material of the light transmitting portion are different colors, wherein the light absorbing portion includes a plurality of parallel inner surfaces and a plurality of connecting inner surfaces, and an inner space is defined by the parallel inner surfaces and the connecting inner surfaces. The imaging lens elements are disposed in the inner space along an optical axis of the imaging lens assembly and correspond to the optical effective section of the light transmitting portion. The light blocking element is disposed adjacent to the light transmitting portion of the dual molded optical element, wherein the light blocking element has a central opening corresponding to the optical effective section of the light transmitting portion. Wherein a diameter of an outer diameter surface of the light transmitting portion is $\Phi L$, a maximum inner diameter of an inner surface of the light absorbing portion is $\Phi Bmax$, and the following condition is satisfied:

$$0.2 < \Phi L/\Phi Bmax < 0.85.$$

According to another aspect of the present disclosure, an electronic device includes the imaging lens assembly according to the aforementioned aspect and an image sensor. The image sensor is disposed on an image surface of the imaging lens assembly.

According to yet another aspect of the present disclosure, an imaging lens assembly includes a dual molded optical element and a plurality of imaging lens elements. The dual molded optical element has an object-side surface and an image-side surface and includes a light transmitting portion and a light absorbing portion. The light transmitting portion includes an optical effective section. A plastic material of the light absorbing portion and a plastic material of the light transmitting portion are different colors, the light absorbing portion includes a first light absorbing portion and a second light absorbing portion, and the first light absorbing portion and the second light absorbing portion are disposed on the object-side surface and the image-side surface of the dual molded optical element, respectively, and separated by the light transmitting portion, wherein the first light absorbing portion is a light blocking area and has a central opening, the second light absorbing portion extends to a direction away from the light transmitting portion and includes a plurality of parallel inner surfaces and a plurality of connecting inner surfaces, and an inner space is defined by the parallel inner surfaces and the connecting inner surfaces. The imaging lens elements are disposed in the inner space along an optical axis of the imaging lens assembly and correspond to the optical effective section of the light transmitting portion. Wherein a diameter of the central opening of the light blocking area is $\Phi i1$, a minimum inner diameter of the second light absorbing portion is $\Phi bi2$, and the following condition is satisfied:

$$0.70 < \Phi i1/\Phi bi2 < 1.43.$$

According to still another aspect of the present disclosure, an imaging lens assembly includes a dual molded optical element, a plurality of imaging lens elements and a light blocking thin layer. The dual molded optical element has an object-side surface and an image-side surface and includes a light transmitting portion and a light absorbing portion. The light transmitting portion includes an optical effective section. The light absorbing portion is located on at least one of the object-side surface and the image-side surface of the dual molded optical element, wherein a plastic material of the light absorbing portion and a plastic material of the light transmitting portion are different colors, the light absorbing portion includes a plurality of parallel inner surfaces and a plurality of connecting inner surfaces, and an inner space is defined by the parallel inner surfaces and the connecting inner surfaces. The imaging lens elements are disposed in the inner space along an optical axis of the imaging lens assembly and correspond to the optical effective section of the light transmitting portion. The light blocking thin layer is disposed on the light transmitting portion of the dual molded optical element and forms a central opening, and the central opening corresponds to the optical effective section of the light transmitting portion. Wherein a diameter of an outer diameter surface of the light transmitting portion is ΦL, a maximum inner diameter of an inner surface of the light absorbing portion is ΦBmax, and the following condition is satisfied:

$$0.2 < \Phi L / \Phi B \max < 0.85.$$

BRIEF DESCRIPTION OF THE DRAWINGS

The present disclosure can be more fully understood by reading the following detailed description of the embodiment, with reference made to the accompanying drawings as follows:

FIG. 2C(1) is a step schematic view of a dual-shot injection molded process of the dual molded optical element according to the 2nd embodiment;

FIG. 2C(2) is another step schematic view of a dual-shot injection molded process of the dual molded optical element according to the 2nd embodiment;

FIG. 2C(3) is a still another step schematic view of a dual-shot injection molded process of the dual molded optical element according to the 2nd embodiment;

FIG. 2C(4) is a yet another step schematic view of a dual-shot injection molded process of the dual molded optical element according to the 2nd embodiment;

FIG. 2C(5) is a further another step schematic view of a dual-shot injection molded process of the dual molded optical element according to the 2nd embodiment;

FIG. 3C(1) is a step schematic view of a dual-shot injection molded process of the dual molded optical element according to the 3rd embodiment;

FIG. 3C(2) is another step schematic view of a dual-shot injection molded process of the dual molded optical element according to the 3rd embodiment;

FIG. 3C(3) is a still another step schematic view of a dual-shot injection molded process of the dual molded optical element according to the 3rd embodiment;

DETAILED DESCRIPTION

Figure 1A:
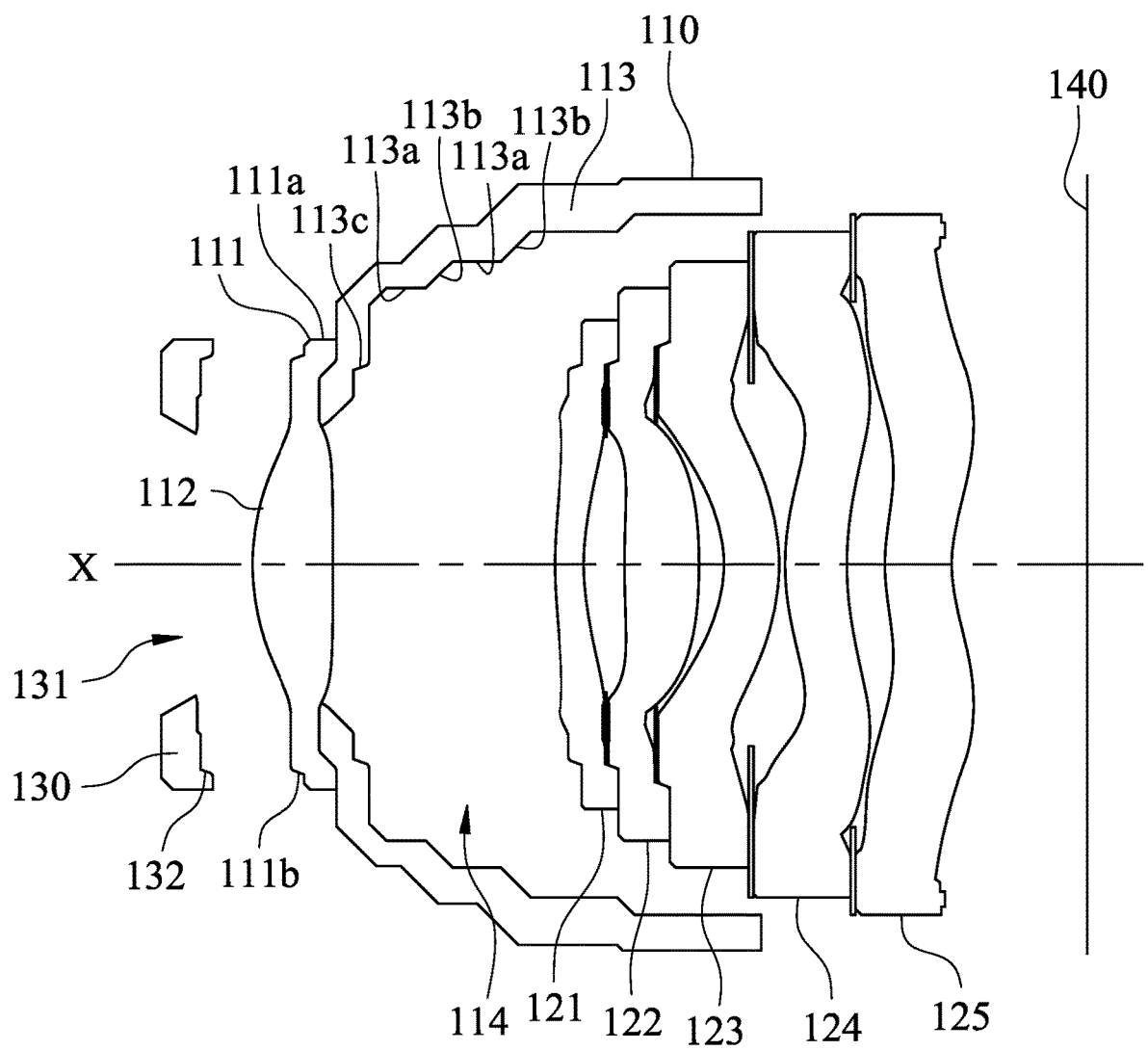
FIG. 1A is a partial exploded view of an imaging lens assembly according to the 1st embodiment of the present disclosure.

An imaging lens assembly includes a dual molded optical element, a plurality of imaging lens elements and a light blocking structure, wherein the dual molded optical element includes plastic materials with two different colors, the imaging lens elements are disposed in an inner space defined by the dual molded optical element, and the light blocking structure is disposed on an object-side surface of the dual molded optical element, so that the generation of stray light can be avoided.

It is worth to be mentioned that the present disclosure provides at least three types of light blocking structures, including a light blocking element, a light absorbing portion of the dual molded optical element and a light blocking thin layer. The principles and the concepts of the light blocking element, the light absorbing portion of the dual molded optical element and the light blocking thin layer are the same. The light blocking element, the light absorbing portion of the dual molded optical element and the light blocking thin layer can be disposed with different types according to different applications respectively in the imaging lens assembly, and it will be further described separately later.

According to one imaging lens assembly of the present disclosure, the dual molded optical element has an object-side surface and an image-side surface and includes a light transmitting portion and a light absorbing portion, wherein the light transmitting portion includes an optical effective section. The light absorbing portion is located on at least one of the object-side surface and the image-side surface of the dual molded optical element, and a plastic material of the light absorbing portion and a plastic material of the light transmitting portion are different colors. In detail, the optical effective section mentioned in the present disclosure is a region which the imaging light passes through, each surfaces of the optical effective section can be a planar surface or an aspheric surface. When the optical effective section is blocked, the image would be affected. The light absorbing portion mentioned in the present disclosure is a region which the visible light cannot pass through (for example, the transmittance of the visible light is less than 50%) and a color of a material of the light absorbing portion can be black. Furthermore, the optical effective section includes at least one aspheric surface so that the distribution of the optical refractive power of the optical effective section can be adjusted effectively so as to prevent the marginal light rays from being excessively refractive and increasing the failure occasions of the injection molding process.

The light absorbing portion includes a plurality of parallel inner surfaces and a plurality of connecting inner surfaces, wherein an inner space is defined by the parallel inner surfaces and the connecting inner surfaces. In more detail, the parallel inner surfaces and the connecting inner surfaces are disposed on an inner surface of the light absorbing portion.

The imaging lens elements are disposed in the inner space along an optical axis of the imaging lens assembly and correspond to the optical effective section of the light transmitting portion.

The light blocking element is disposed adjacent to the light transmitting portion of the dual molded optical element, wherein the light blocking element has a central opening corresponding to the optical effective section of the light transmitting portion. Therefore, by the arrangement of the light blocking element, the generation of the stray light can be reduced effectively. Furthermore, in addition to defining the inner space capable of accommodating the imaging lens elements, the parallel inner surfaces and the connecting inner surfaces are favorable for aligning the imaging lens elements.

When a diameter of an outer diameter surface of the light transmitting portion is $\Phi L$, and a maximum inner diameter of the inner surface of the light absorbing portion is $\Phi Bmax$, the following condition is satisfied: $0.2<\Phi L/\Phi Bmax<0.85$. It is favorable for reducing a size of the object side of the imaging lens assembly by reducing the range of the outer diameter of the light transmitting portion. More preferably, the following condition can be satisfied: $0.35<\Phi L/\Phi Bmax<0.75$.

The light transmitting portion and the light absorbing portion of the dual molded optical element can be formed by a dual-shot injection molded method. In detail, the term "molded" mentioned in the present disclosure refers to dual-shot injection molded process or secondary molded process. Therefore, the concentricity between the optical effective section and the inner space can be provided by the precision of the molds, so that the accuracy of the alignment of the imaging lens elements to the optical effective section will not be affected by the assembling tolerance so as to improve the optical resolution quality.

The light blocking element can be made of a plastic material. The light transmitting portion can further include a first axial connecting surface, the light blocking element can further include a second axial connecting surface, and the first axial connecting surface is connected to the second axial connecting surface so as to align the central opening of the light blocking element and a center of the dual molded optical element. Therefore, the overlapping coverage between the light entering opening of the imaging lens assembly and the optical effective section is better, and it is favorable for preventing a part of the light from passing an outside of the optical effective section and then forming stray light which is unable to form images, so that the probability of stray light generation can be reduced.

When a diameter of the central opening of the light blocking element is $\Phi i$, and a minimum inner diameter of the light absorbing portion is $\Phi bi$, the following condition can be satisfied: $0.70<\Phi i/\Phi bi<1.43$. Therefore, it is favorable for enhancing the efficiency for blocking unexpected lights, especially for enhancing the light blocking efficiency of an area that the incident angle is larger than the viewing angle when a strong light enters the imaging lens assembly.

The light absorbing portion can further include a third axial connecting surface for connecting to at least one of the imaging lens elements adjacent thereto so as to align the center of the dual molded optical element and a center of the at least one of the imaging lens elements. Therefore, it is favorable for reducing the tilting situation of the imaging lens elements during the assembling process by the aligning structure of the light absorbing portion.

When a central thickness of the optical effective section is CT, and a maximum height of the dual molded optical element parallel to the optical axis is H, the following condition can be satisfied: $0.05<CT/H<0.4$. Therefore, warpage of the overly thin optical effective section caused by the shrinking of the light absorbing portion can be avoided.

When a number of the imaging lens elements which can be accommodated in the inner space is N, the following condition can be satisfied: $3<N\leq7$. Therefore, it is favorable for accommodating more imaging lens elements so as to correspond to more different optical specifications, so that the scope of application can be more diversified.

At least one of an object-side surface and an image-side surface of the optical effective section can change from concave to convex from a paraxial region thereof to a peripheral region thereof. Therefore, it is favorable for further adjusting the distribution of the optical refractive power of the optical effective section greatly so as to prevent the marginal light rays from being excessively refractive and increasing the failure occasions of the injection molding process.

The light transmitting portion can further include an outer diameter surface exposed on an outside of the imaging lens assembly. In other words, the outer diameter surface of the light transmitting portion is uncovered. Therefore, it is favorable for designing better molding conditions of the mold, so that it is favorable for controlling the production quality in mass production and obtaining more abundant molding adjustment margins.

The central opening of the light blocking element can be surrounded by a tip structure, and when an angle of the tip structure is $\theta$, the following condition can be satisfied: $45$ degrees$<\theta<120$ degrees. Therefore, the flashes generated during the molding process or the short shot situation caused by insufficient filling of the central opening can be reduced. Moreover, the tip structure can include an object-side terminal surface and an image-side terminal surface, and the object-side terminal surface is linearly shrunk from an object side to an image side of the imaging lens assembly, and the image-side terminal surface is linearly shrunk from the image side to the object side of the imaging lens assembly. Therefore, it is favorable for reduce the injuries caused by the uneven clamping power applied to the mold during the production process.

Furthermore, the inner space can be gradually increased along at least one of an object-side direction and an image-side direction of the imaging lens assembly. Therefore, it is suitable for optical designing demands with higher resolution.

The imaging lens assembly can further include a maintaining element directly contacted with at least one of the parallel inner surfaces so as to position the imaging lens elements in the inner space. Therefore, the overall mechanical stability of the imaging lens assembly can be enhanced, and the optical resolution will not be affected easily by external force.

The present disclosure provides another imaging lens assembly including a dual molded optical element and a plurality of imaging lens elements. The dual molded optical element has an object-side surface and an image-side surface and includes a light transmitting portion and a light absorbing portion, wherein a plastic material of the light transmitting portion and a plastic material of the light absorbing portion are different colors, and the light transmitting portion and the light absorbing portion of the dual molded optical element can be formed by a dual-shot injection molded method. The light transmitting portion includes an optical effective section, the light absorbing portion can include a first light absorbing portion and a second light absorbing portion, the first light absorbing portion and the second light absorbing portion are disposed on the object-side surface and the image-side surface of the dual molded optical element, respectively, and separated by the light transmitting portion, wherein the first light absorbing portion is a light absorbing area and has a central opening, the second light absorbing portion extends to a direction away from the light transmitting portion and includes a plurality of parallel inner surfaces and a plurality of connecting inner surfaces, and an inner space is defined by the parallel inner surfaces and the connecting inner surfaces. That is, the light absorbing portion of the imaging lens assembly can be one part of the light absorbing portion of the dual molded optical element instead of an extra arranged element. Therefore, it is favorable for the assembly of the imaging lens assembly and reducing the size thereof. The imaging lens elements are disposed in the inner space along the optical axis of the imaging lens assembly and correspond to the optical effective section of the light transmitting portion. When a diameter of the central opening of the light absorbing portion is $\Phi i1$, and a minimum inner diameter of the light absorbing portion is $\Phi bi2$, the following condition is satisfied: $0.70 < \Phi i1/\Phi bi2 < 1.43$.

The second light absorbing portion can include a third axial connecting surface for connecting to at least one of the imaging lens elements adjacent thereto so as to align a center of the dual molded optical element and a center of at least one of the imaging lens elements. Therefore, it is favorable for reducing the tilting situation of the imaging lens elements during the assembling process by the aligning structure of the light absorbing portion.

When a central thickness of the optical effective section is CT, and a maximum height of the dual molded optical element parallel to the optical axis is H, the following condition can be satisfied: $0.05 < CT/H < 0.4$. Therefore, warpage of the overly thin optical effective section caused by the shrinking of the light absorbing portion can be avoided.

The light transmitting portion can further include an outer diameter surface exposed on an outside of the imaging lens assembly. In other words, the outer diameter surface of the light transmitting portion is uncovered. Therefore, it is favorable for designing better molding conditions of the mold, so that it is favorable for controlling the production quality in mass production and obtaining more abundant molding adjustment margins.

The central opening of the light blocking element can be surrounded by a tip structure, and when an angle of the tip structure is $\theta$, the following condition can be satisfied: 45 degrees $< \theta < 120$ degrees. Therefore, the flashes generated during the molding process or the short shot situation caused by insufficient filling of the central opening can be reduced.

The present disclosure provides still another imaging lens assembly including a dual molded optical element, a plurality of imaging lens elements and a light blocking thin layer. The dual molded optical element has an object-side surface and an image-side surface and includes a light transmitting portion and a light absorbing portion, and the light transmitting portion and the light absorbing portion which can be formed by a dual-shot injection molded method. The light transmitting portion includes an optical effective section, and the light absorbing portion is located on at least one of the object-side surface and the image-side surface of the dual molded optical element. A plastic material of the light absorbing portion and a plastic material of the light transmitting portion are different colors, wherein the light absorbing portion includes a plurality of parallel inner surfaces and a plurality of connecting inner surfaces, and an inner space is defined by the parallel inner surfaces and the connecting inner surfaces. The imaging lens elements are disposed in the inner space along the optical axis of the imaging lens assembly and correspond to the optical effective section of the light transmitting portion. The light blocking thin layer is disposed on the light transmitting portion of the dual molded optical element and forms a central opening, and the central opening corresponds to the optical effective section of the light transmitting portion. When a diameter of an outer diameter surface of the light transmitting portion is $\Phi L$, and a maximum inner diameter of an inner surface of the light absorbing portion is $\Phi Bmax$, the following condition is satisfied: $0.2 < \Phi L/\Phi Bmax < 0.85$. In detail, the light blocking thin layer can be a light blocking sheet or a light blocking coating. Therefore, it is favorable for reducing a size of the object side of the imaging lens assembly effectively.

The light absorbing portion can further include a third axial connecting surface for connecting to at least one of the imaging lens elements adjacent thereto so as to align the center of the dual molded optical element and a center of at least one of the imaging lens elements. Therefore, it is favorable for reducing the tilting situation of the imaging lens elements during the assembling process by the aligning structure of the light absorbing portion.

The light transmitting portion can further include an outer diameter surface covered with an opaque coating. By the aforementioned arrangement, the light blocking thin layer, the opaque coating and the light absorbing portion can form a light trap structure. Therefore, it is not easy to cause reflections inside the imaging lens assembly when stray light enters therein so as to reduce the effects of the stray light.

When a number of the imaging lens elements which can be accommodated in the inner space is N, the following condition can be satisfied: $3 < N \leq 7$. Therefore, it is favorable for accommodating more imaging lens elements so as to correspond to more different optical specifications, so that the scope of application can be more diversified.

The light absorbing portion is located on only one of the object-side surface and the image-side surface of the dual molded optical element. Therefore, the complexity of dual-shot injection molded method can be simplified so as to increase the surface precision of the optical effective section.

The inner space is gradually increased along at least one of an object-side direction and an image-side direction of the imaging lens assembly. Therefore, it is suitable for optical designing demands with higher resolution, and the outer diameters of a part of the imaging lens elements can be reduced so as to reduce the paths of the unexpected light effectively, so that some optical designs with a large amount of incident light can have less influence by stray light.

Furthermore, a shape of the dual molded optical element can be stepped. Therefore, the structural intensity of the light absorbing portion can be increased, and it is favorable for maintaining a better roundness of the parallel inner surface.

Each of the aforementioned features of the imaging lens assembly of the present disclosure can be utilized in numerous combinations, so as to achieve the corresponding functionality.

The present disclosure further provides an electronic device including any one of the imaging lens assemblies according to the aforementioned aspects and an image sensor, wherein the image sensor is disposed on an image surface of the imaging lens assembly. Therefore, it is favorable for enhancing the image quality. More preferably, the electronic device can further include a control unit, a display, a storage unit, a random-access memory (RAM), or the combination thereof.

According to the above descriptions, the specific embodiments and reference drawings thereof are given below so as to describe the present disclosure in detail.

1st Embodiment

Figure 1B:
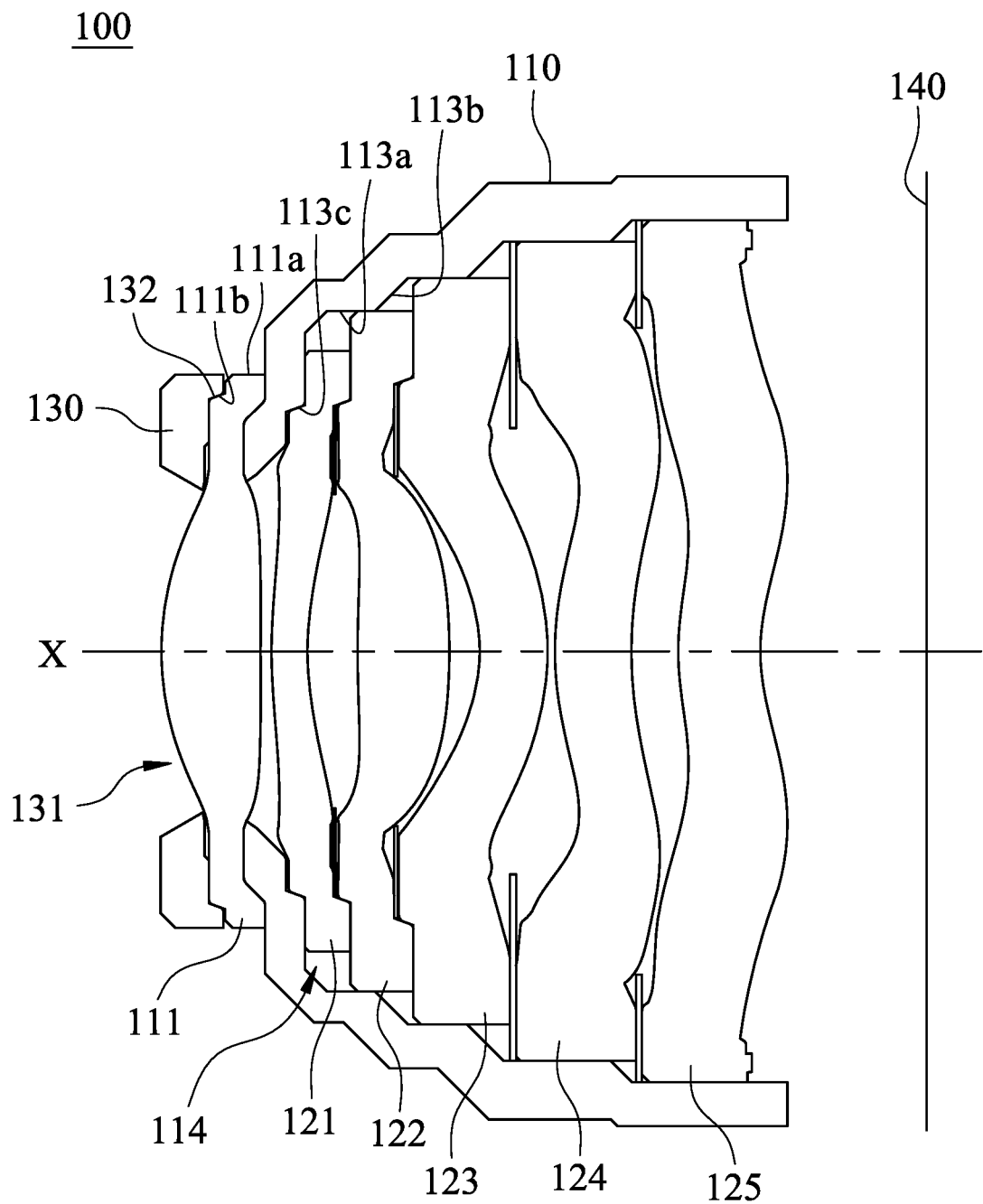
FIG. 1B is an assembly schematic view of the imaging lens assembly according to the 1st embodiment of FIG. 1A.

FIG. 1A is a partial exploded view of an imaging lens assembly 100 according to the 1st embodiment of the present disclosure. FIG. 1B is an assembly schematic view of the imaging lens assembly 100 according to the 1st embodiment of FIG. 1A. As shown in FIG. 1A and FIG. 1B, the imaging lens assembly 100 includes a dual molded optical element 110, a plurality of imaging lens elements and a light blocking element 130, and an image side of the imaging lens assembly 100 further includes an image surface 140. The imaging lens elements are disposed in the dual molded optical element 110, and the light blocking element 130 is connected to one side of the dual molded optical element 110.

The dual molded optical element 110 has an object-side surface and an image-side surface and includes a light transmitting portion 111 and a light absorbing portion 113. A plastic material of the light transmitting portion 111 and a plastic material of the light absorbing portion 113 are different colors, and the light transmitting portion 111 and the light absorbing portion 113 are formed by a dual-shot injection molded method. The light transmitting portion 111 includes an optical effective section 112. An object-side surface and an image-side surface of the optical effective section 112 are both aspheric, and the image-side surface of the optical effective section 112 changes from concave to convex from a paraxial region thereof to a peripheral region thereof.

Figure 1C:
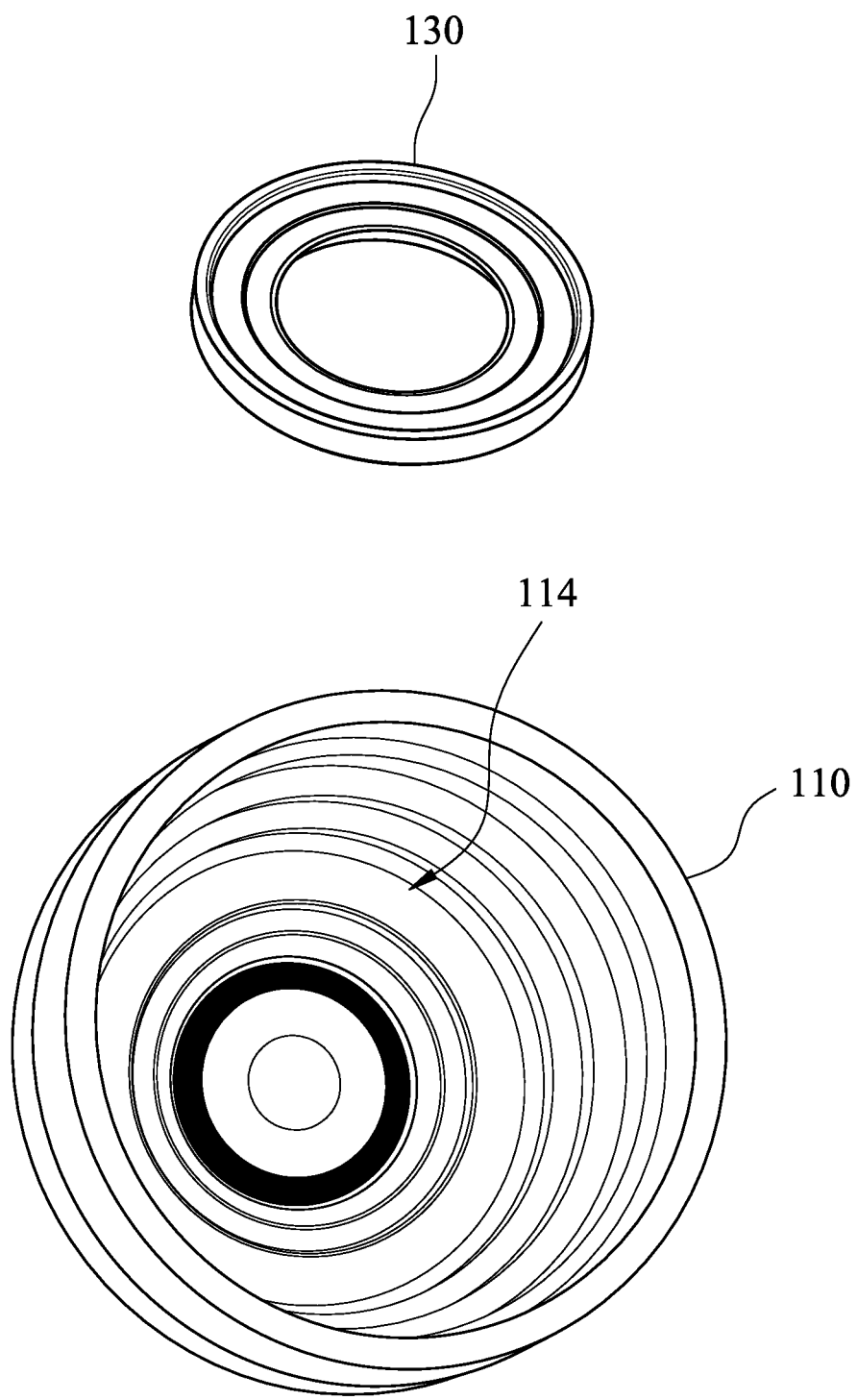
FIG. 1C is a three-dimensional schematic view of a dual molded optical element and a light blocking element according to the 1st embodiment of FIG. 1A.

The light absorbing portion 113 is located on at least one of the object-side surface and the image-side surface of the dual molded optical element 110. In particular, in the 1st embodiment, the light absorbing portion 113 is only located on the image-side surface of the dual molded optical element 110. The light absorbing portion 113 includes a plurality of parallel inner surfaces 113a, a plurality of connecting inner surfaces 113b and a third axial connecting surface 113c. Please refer to FIG. 1C, which is a three-dimensional schematic view of the dual molded optical element 110 and the light blocking element 130 according to the 1st embodiment of FIG. 1A. As shown in FIG. 1A, FIG. 1B and FIG. 1C, an inner space 114 is defined by the parallel inner surfaces 113a and the connecting inner surfaces 113b. In particular, in the 1st embodiment, numbers of the parallel inner surfaces 113a and the connecting inner surfaces 113b are respectively three, and the parallel inner surfaces 113a and the connecting inner surfaces 113b are disposed alternately with each other. The inner space 114 is gradually increased along an image-side direction of the imaging lens assembly 100. Furthermore, the third axial connecting surface 113c is for connecting to at least one of the imaging lens elements adjacent thereto so as to align a center of the dual molded optical element 100 and a center of at least one of the imaging lens elements. In particular, in the 1st embodiment, the third axial connecting surface 113c is connected to a first imaging lens element 121.

In the imaging lens assembly 100 according to the 1st embodiment, a number of the imaging lens elements is five, which are a first imaging lens element 121, a second imaging lens element 122, a third imaging lens element 123, a fourth imaging lens element 124 and a fifth imaging lens element 125. The first imaging lens element 121, the second imaging lens element 122, the third imaging lens elements 123, the fourth imaging lens element 124 and the fifth imaging lens element 125 are disposed in the inner space 114 along an optical axis X of the imaging lens assembly 100 and correspond to the optical effective section 112 of the light transmitting portion 111. Furthermore, an optical element, such as a light blocking sheet, can be disposed between the imaging lens elements according to requirements, and there is no reference numbers and descriptions in the 1st embodiment.

Figure 1D:
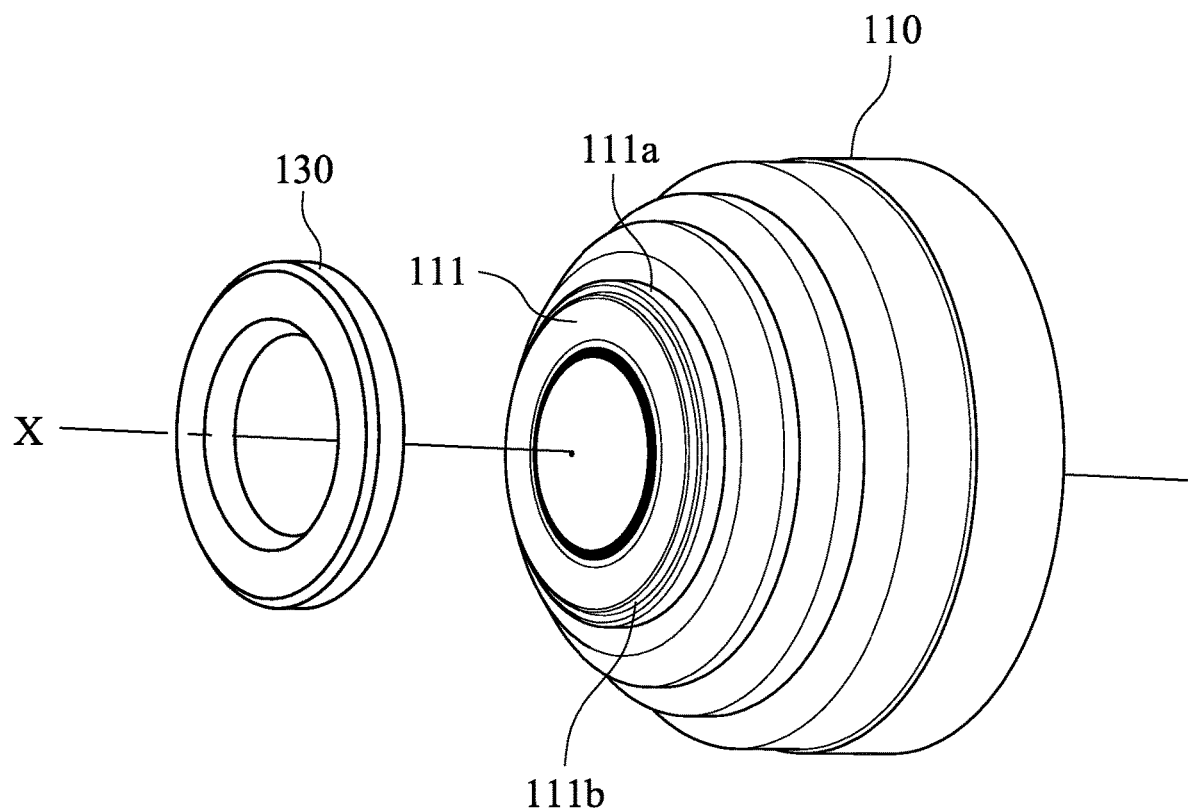
FIG. 1D is another three-dimensional schematic view of the dual molded optical element and the light blocking element according to the 1st embodiment of FIG. 1A.

The light blocking element 130 is made of a plastic material and disposed adjacent to the light transmitting portion 111 of the dual molded optical element 110, and the light blocking element 130 has a central opening 131 corresponding to the optical effective section 112 of the light transmitting portion 111. Please refer to FIG. 1D, which is another three-dimensional schematic view of the dual molded optical element 110 and the light blocking element 130 according to the 1st embodiment of FIG. 1A. As shown in FIG. 1A, FIG. 1B and FIG. 1D, the light transmitting portion 111 further includes a first axial connecting surface 111b, the light blocking element 130 further includes a second axial connecting surface 132, and the first axial connecting surface 111b is connected to the second axial connecting surface 132 so as to align the central opening 131 of the light blocking element 130 and the center of the dual molded optical element 100. Furthermore, the light transmitting portion 111 can further include an outer diameter surface 111a, and the light blocking element 130 is disposed on an object side of the light transmitting portion 111. The light blocking element 130 is connected to the first axial connecting surface 111b via the second axial connecting surface 132 and will not cover the outer diameter surface 111a, so that the outer diameter surface 111a of the light transmitting portion 111 is exposed on an outside of the imaging lens assembly 100.

Figure 1E:
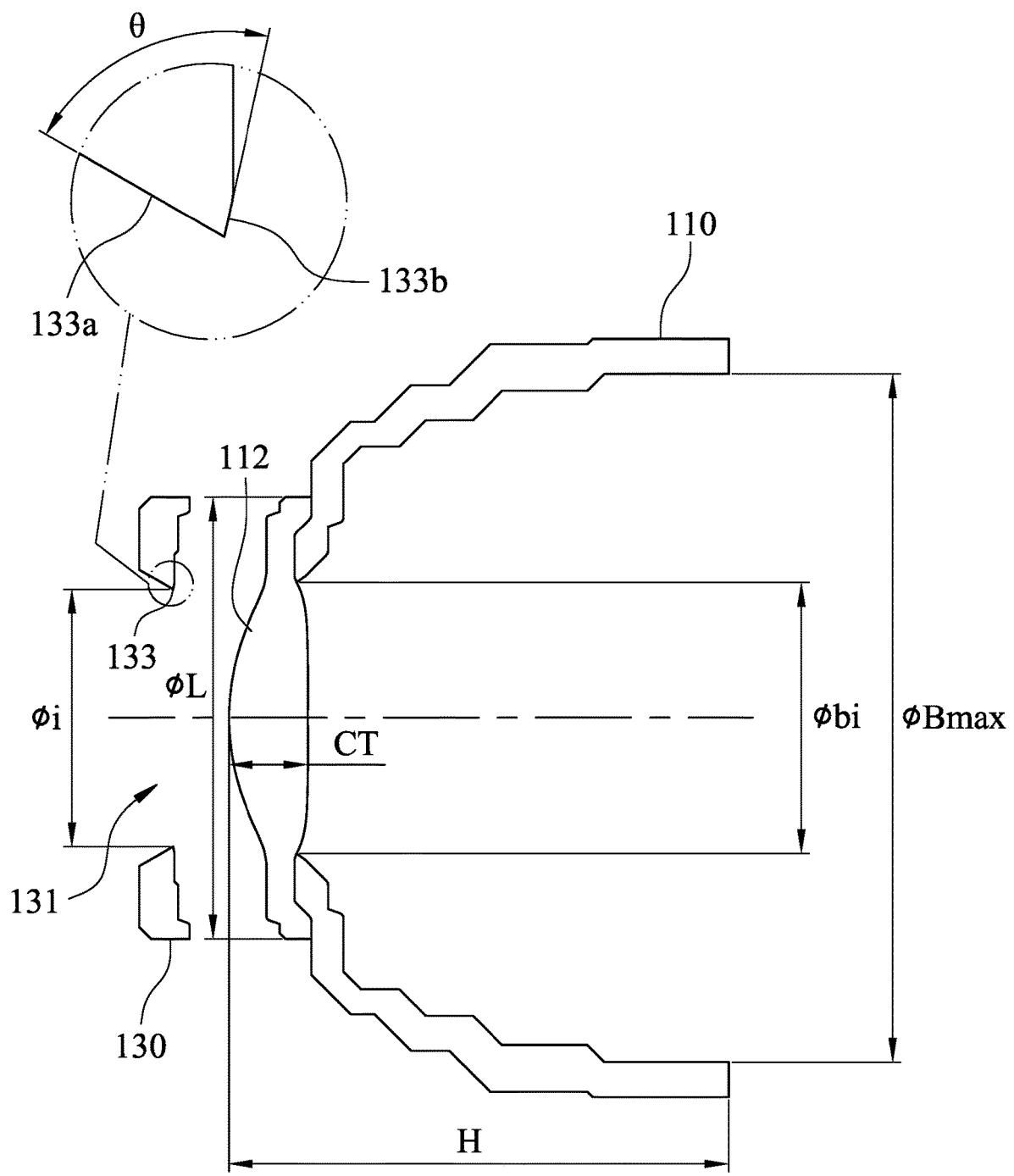
FIG. 1E is a schematic view of related parameters of the dual molded optical element and the light blocking element according to the 1st embodiment of FIG. 1A.

FIG. 1E is a schematic view of related parameters of the dual molded optical element 110 and the light blocking element 130 according to the 1st embodiment of FIG. 1A. As shown in FIG. 1E, a diameter of the outer diameter surface of the light transmitting portion 111 is $\Phi L$, a maximum inner diameter of an inner surface of the light absorbing portion 113 is $\Phi Bmax$, a diameter of the central opening 131 of the light blocking element 130 is $\Phi i$, a minimum inner diameter of the light absorbing portion 113 is $\Phi bi$, a central thickness of the optical effective section 112 is CT, a maximum height of the dual molded optical element 110 parallel to the optical axis X is H, and a number of the imaging lens elements which can be accommodated in the inner space 114 is N. Furthermore, the central opening 131 of the light blocking element 130 is surrounded by a tip structure 133, and an angle of the tip structure 133 is θ. In particular, the tip structure 133 includes an object-side terminal surface 133a and an image-side terminal surface 133b, the object-side terminal surface 133a is linearly shrunk from an object side to the image side of the imaging lens assembly 100, the image-side terminal surface 133b is linearly shrunk from the image side to the object side of the imaging lens assembly 100, and the angle θ of the tip structure 133 is an angle between the object-side terminal surface 133a and the image-side terminal surface 133b. The data of the aforementioned parameters according to the 1st embodiment of the present disclosure are listed below.

| 1st embodiment | | | |
|---|---|---|---|
| ΦL (mm) | 3.78 | CT (mm) | 0.677 |
| ΦBmax (mm) | 5.89 | H (mm) | 4.2737 |
| ΦL/ΦBmax | 0.64 | CT/H | 0.16 |
| Φi (mm) | 2.204 | N | 5 |
| Φbi (mm) | 2.32 | θ (degrees) | 72.45 |
| Φi/Φbi | 0.95 | | |

2nd Embodiment

Figure 2A:
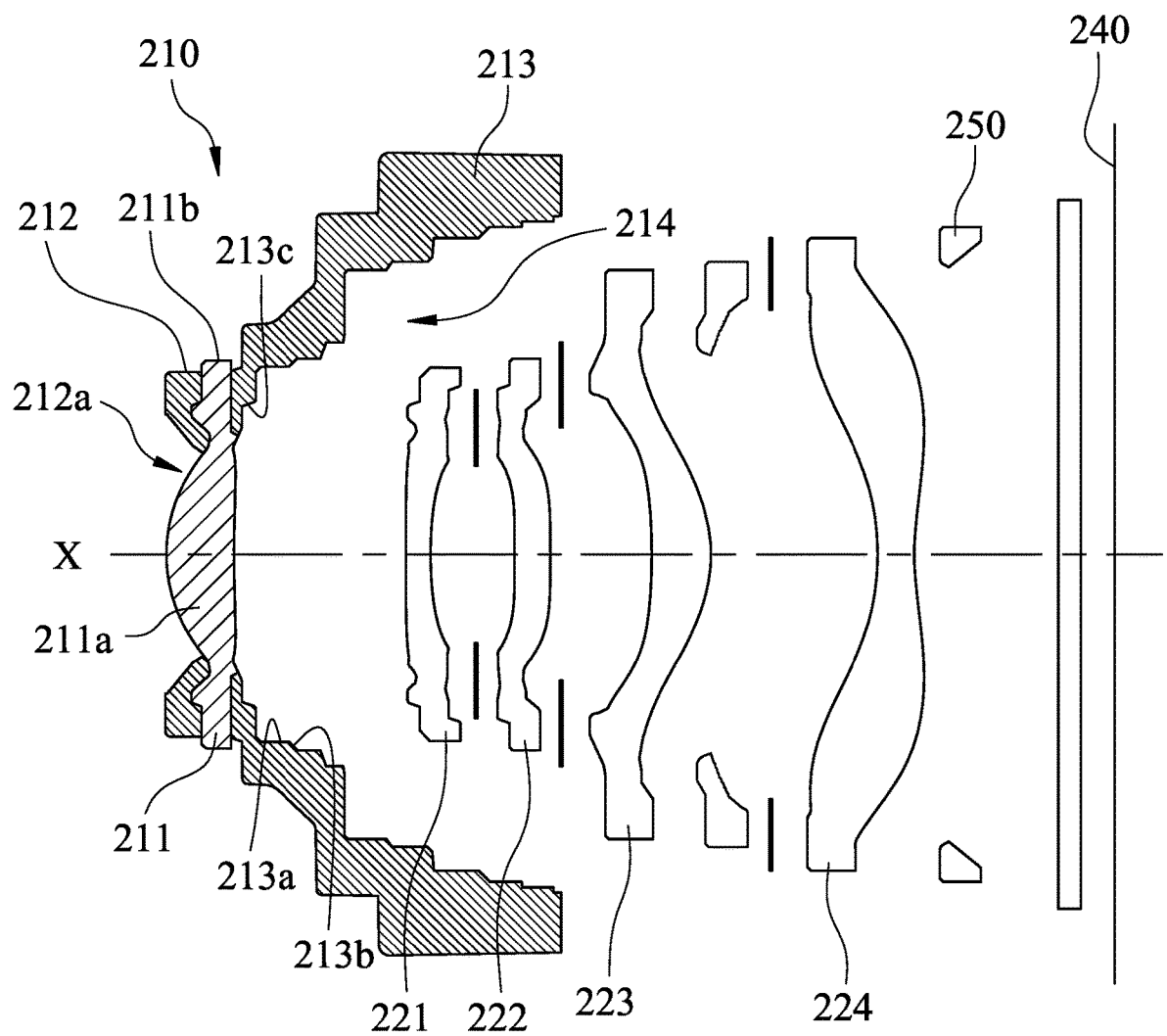
FIG. 2A is a partial exploded view of an imaging lens assembly according to the 2nd embodiment of the present disclosure.
Figure 2B:
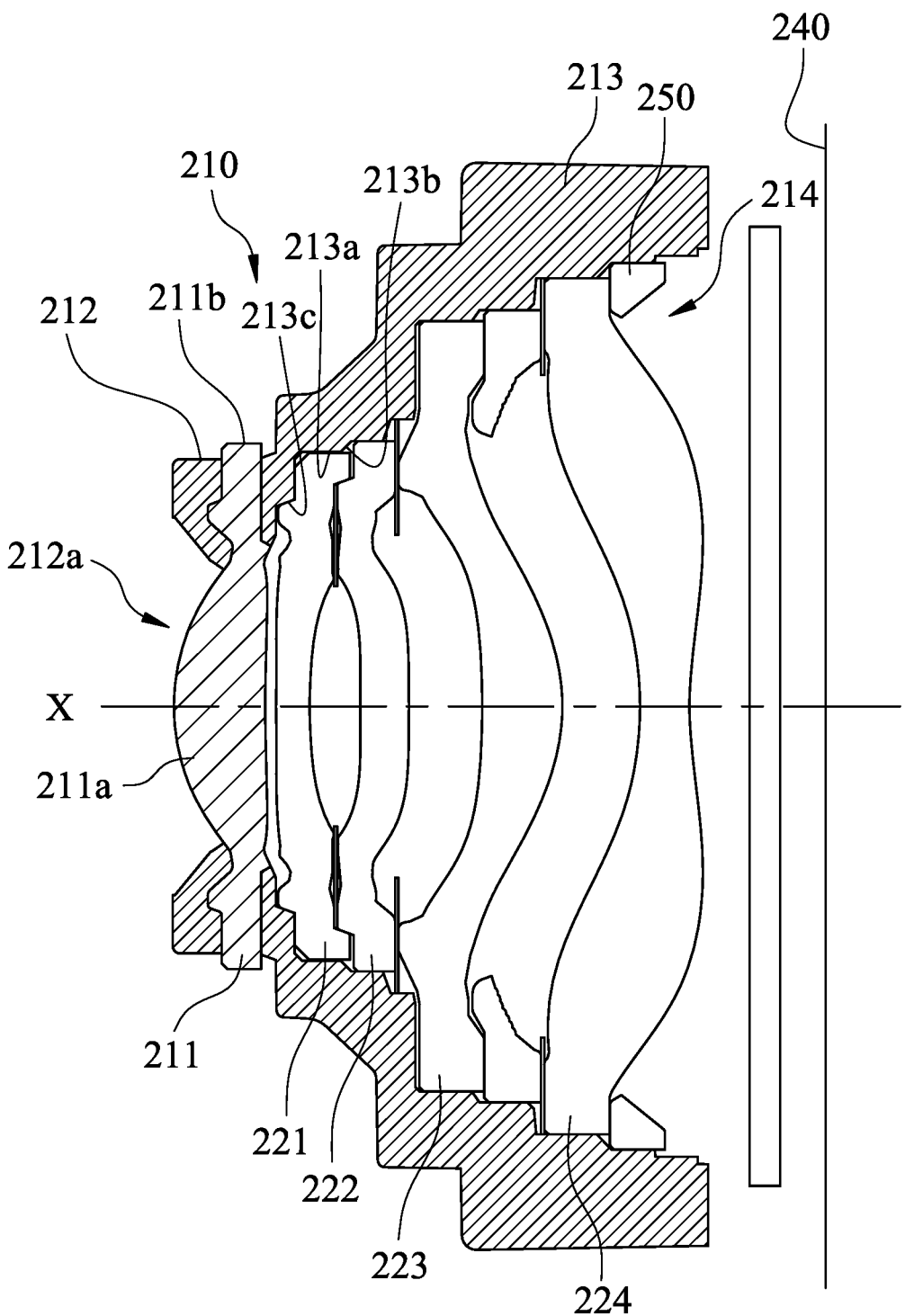
FIG. 2B is an assembly schematic view of the imaging lens assembly according to the 2nd embodiment of FIG. 2A.

FIG. 2A is a partial exploded view of an imaging lens assembly 200 according to the 2nd embodiment of the present disclosure. FIG. 2B is an assembly schematic view of the imaging lens assembly 200 according to the 2nd embodiment of FIG. 2A. As shown in FIG. 2A and FIG. 2B, the imaging lens assembly 200 includes a dual molded optical element 210 and a plurality of imaging lens elements, and an image side of the imaging lens assembly 200 further includes an image surface 240. The imaging lens elements are disposed in the dual molded optical element 210.

The dual molded optical element 210 has an object-side surface and an image-side surface and includes a light transmitting portion 211 and a light absorbing portion (reference number is omitted). A plastic material of the light transmitting portion 211 and a plastic material of the light absorbing portion are different colors, the light transmitting portion 211 and the light absorbing portion are formed by a dual-shot injection molded method, and the light absorbing portion includes a first light absorbing portion 212 and a second light absorbing portion 213.

Please refer to FIG. 2C(1), FIG. 2C(2), FIG. 2C(3), FIG. 2C(4) and FIG. 2C(5), which are respectively a step schematic view of a dual-shot injection molded process of the dual molded optical element 210 according to the 2nd embodiment. As shown in FIG. 2C(1) and FIG. 2C(2), in the 2nd embodiment, a mold 270 including a fixed side element 271 and a movable side element 272 is provided, and a chamber between the fixed side element 271 and the movable side element 272 is for perfusing the plastic material of the light absorbing portion 212 so as to form the first light absorbing portion 212. As shown in FIG. 2C(3) and FIG. 2C(4), in the 2nd embodiment, a mold 280 including a fixed side element 281, a movable side element 282 and a sliding element 283 is provided, and a chamber between the fixed side element 281, the movable side element 282 and the sliding element 283 is for perfusing the plastic material of the light absorbing portion so as to form the second light absorbing portion 213. As shown in FIG. 2C(5), after the first light absorbing portion 212 and the second light absorbing portion 213 are formed, the movable side element 272 of the mold 270 is replaced with the movable side element 282 and the sliding element 283 of the mold 280 before a mold releasing step, so that a chamber between the first light absorbing portion 212 and the second light absorbing portion 213 can be for perfusing the plastic material of the light transmitting portion 211 so as to form the light transmitting portion 211. Therefore, the dual molded optical element 210 can be formed by the dual-shot injection molded method.

As shown in FIG. 2A, the light transmitting portion 211 includes an optical effective section 211a having an object-side surface and an image-side surface being both aspheric, and the image-side surface of the optical effective section 211a changes from concave to convex from a paraxial region thereof to a peripheral region thereof.

The first light absorbing portion 212 and the second light absorbing portion 213 of the light absorbing portion are disposed on the object-side surface and the image-side surface of the dual molded optical element 210, respectively, and separated by the light transmitting portion 211. The first light absorbing portion 212 is a light blocking area and has a central opening 212a, the second light absorbing portion 213 extends to a direction away from the light transmitting portion 211 and includes a plurality of parallel inner surfaces 213a, a plurality of connecting inner surfaces 213b and a third axial connecting surface 213c. An inner space 214 is defined by the parallel inner surfaces 213a and the connecting inner surfaces 213b. The third axial connecting surface 213c is for connecting to at least one of the imaging lens elements adjacent thereto so as to align a center of the dual molded optical element 210 and a center of the at least one of the imaging lens elements. In particular, in the 2nd embodiment, the third axial connecting surface 213c is connected to a first imaging lens elements 221.

In the imaging lens assembly 200 according to the 2nd embodiment, a number of the imaging lens elements is four, which are a first imaging lens element 221, a second imaging lens element 222, a third imaging lens element 223 and a fourth imaging lens element 224. The first imaging lens element 221, the second imaging lens element 222, the third imaging lens element 223 and the fourth imaging lens element 224 are disposed in the inner space 241 along an optical axis X of the imaging lens assembly 200 and correspond to the optical effective section 211a of the light transmitting portion 211. Furthermore, an optical element, such as a light blocking sheet and a spacer, can be disposed between the imaging lens elements, other optical elements, such as filters, etc., can be disposed between the image surface 240 and the imaging lens elements according to requirements, and there is no reference numbers and descriptions in the 2nd embodiment.

Furthermore, the light transmitting portion 211 can further include an outer diameter surface 211b. During the molding process, the first light absorbing portion 212 and the second light absorbing portion 213 are respectively disposed on an object side and an image side of the light transmitting portion 211 and will not cover the outer diameter surface 211b, so that the outer diameter surface 211b of the light transmitting portion 211 is exposed on an outside of the imaging lens assembly 200.

Furthermore, the imaging lens assembly 200 can further include a maintaining element 250, which is directly contacted with at least one of the parallel inner surfaces 213a so as to position the imaging lens elements in the inner space 214.

Figure 2D:
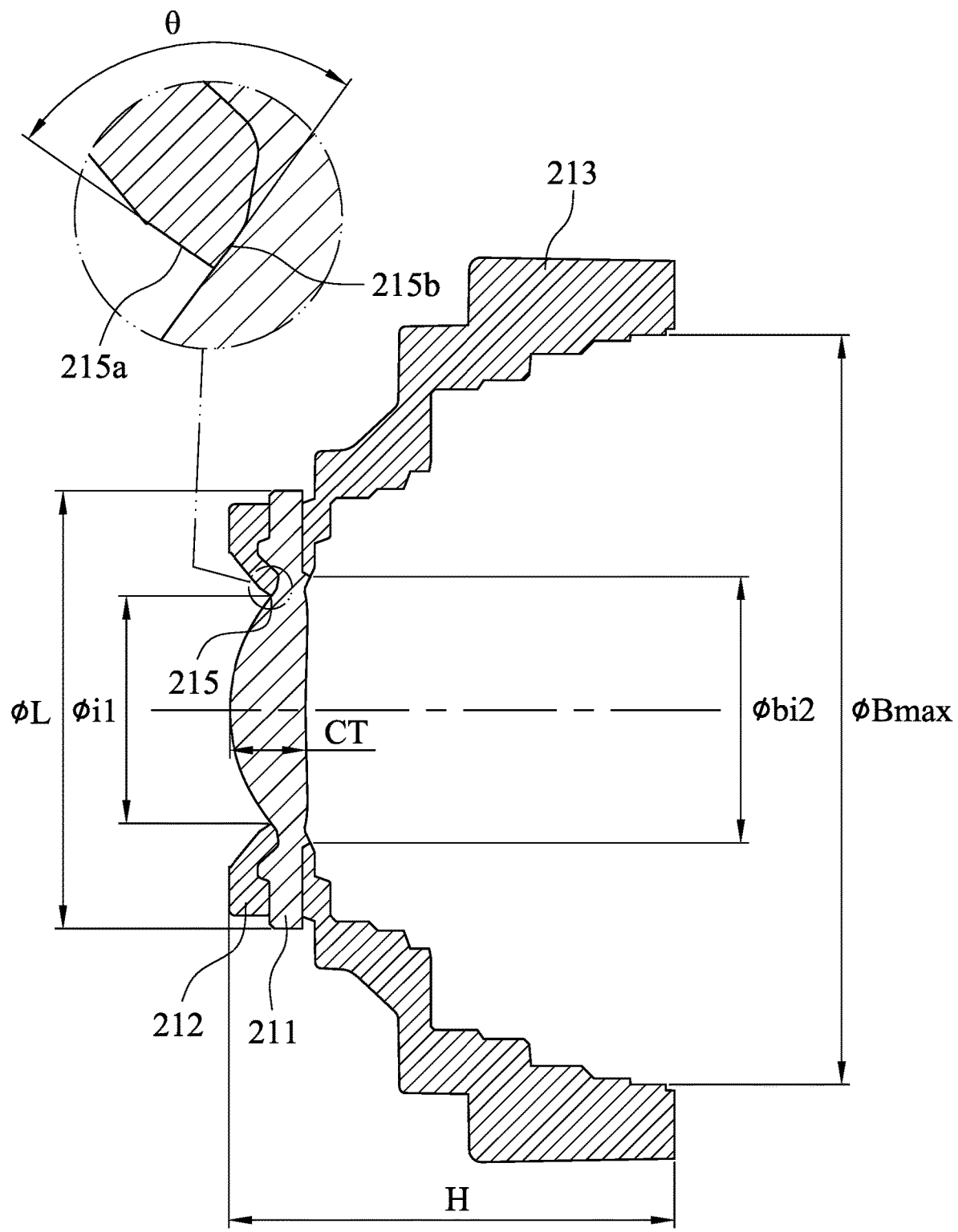
FIG. 2D is a schematic view of related parameters of the dual molded optical element according to the 2nd embodiment of FIG. 2A.

FIG. 2D is a schematic view of related parameters of the dual molded optical element 200 according to the 2nd embodiment of FIG. 2A. As shown in FIG. 2D, a diameter of the outer diameter surface of the light transmitting portion 211 is ΦL, a maximum inner diameter of an inner surface of the light absorbing portion is ΦBmax, a diameter of the central opening of the light absorbing portion (that is, a diameter of the central opening 212a of the first light absorbing portion 212) is Φi1, a minimum inner diameter of the second light absorbing portion 213 is Φbit, a central thickness of the optical effective section 211a is CT, a maximum height of the dual molded optical element 210 parallel to the optical axis X is H, and a number of the imaging lens elements which can be accommodated in the inner space 214 is N. Furthermore, the central opening 212a of the first light absorbing portion 212 is surrounded by a tip structure 215, and an angle of the tip structure 215 is θ. In particular, the tip structure 215 includes an object-side terminal surface 215a and an image-side terminal surface 215b, the object-side terminal surface 215a is linearly shrunk from an object side to the image side of the imaging lens assembly 200, the image-side terminal surface 215b is linearly shrunk from the image side to the object side of the imaging lens assembly 200, and the angle θ of the tip structure 215 is an angle between the object-side terminal surface 215a and the image-side terminal surface 215b. The data of the aforementioned parameters according to the 2nd embodiment of the present disclosure are listed below.

| 2nd embodiment | | | |
|---|---|---|---|
| φL (mm) | 3.617 | CT (mm) | 0.627 |
| φBmax (mm) | 6.2 | H (mm) | 3.68 |
| φL/φBmax | 0.58 | CT/H | 0.17 |
| φi1 (mm) | 1.88 | N | 4 |
| φbi2 (mm) | 2.2045 | θ(degrees) | 90.84 |
| φi1/φbi2 | 0.85 | | |

3rd Embodiment

Figure 3A:
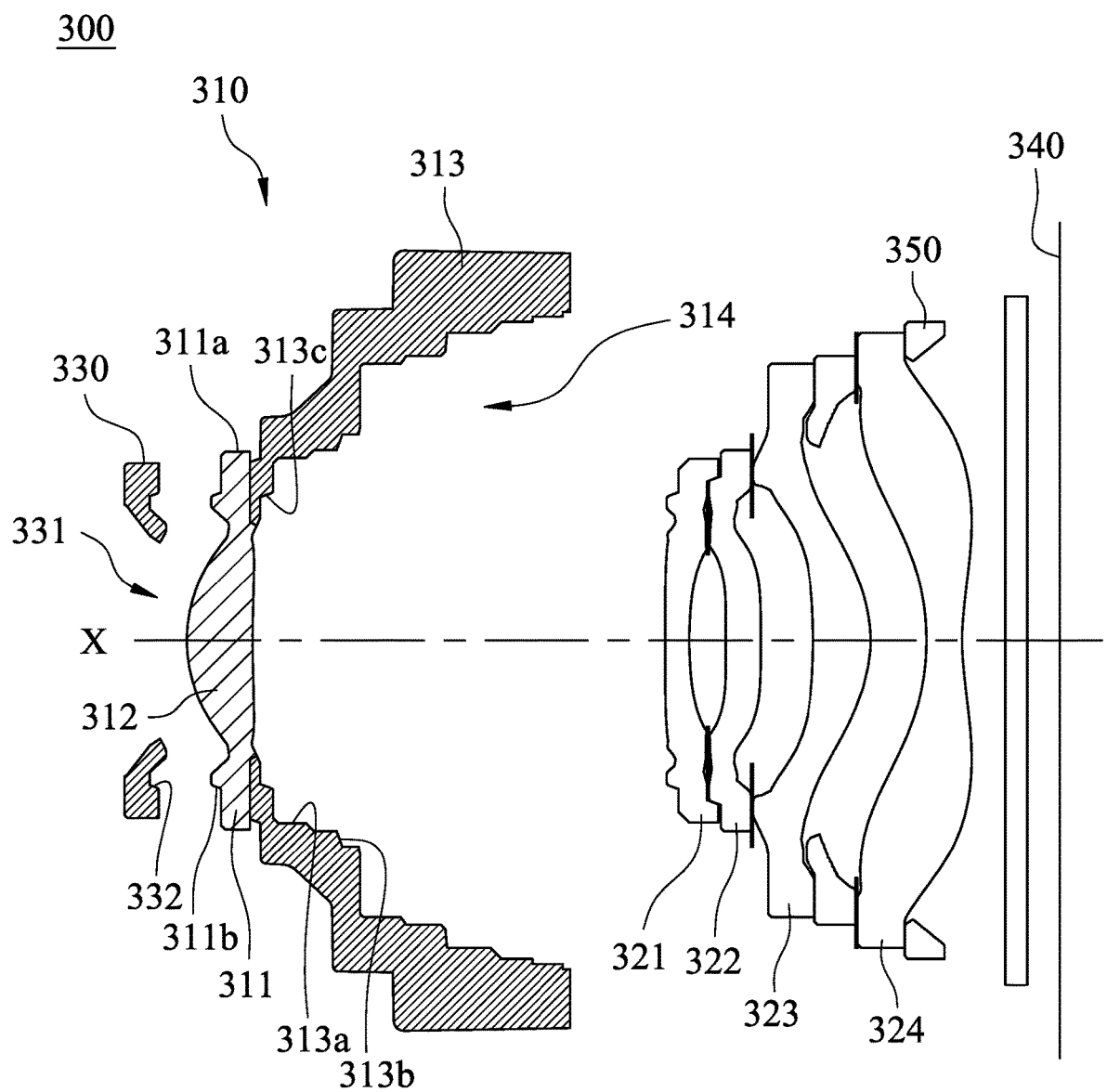
FIG. 3A is a partial exploded view of an imaging lens assembly according to the 3rd embodiment of the present disclosure.
Figure 3B:
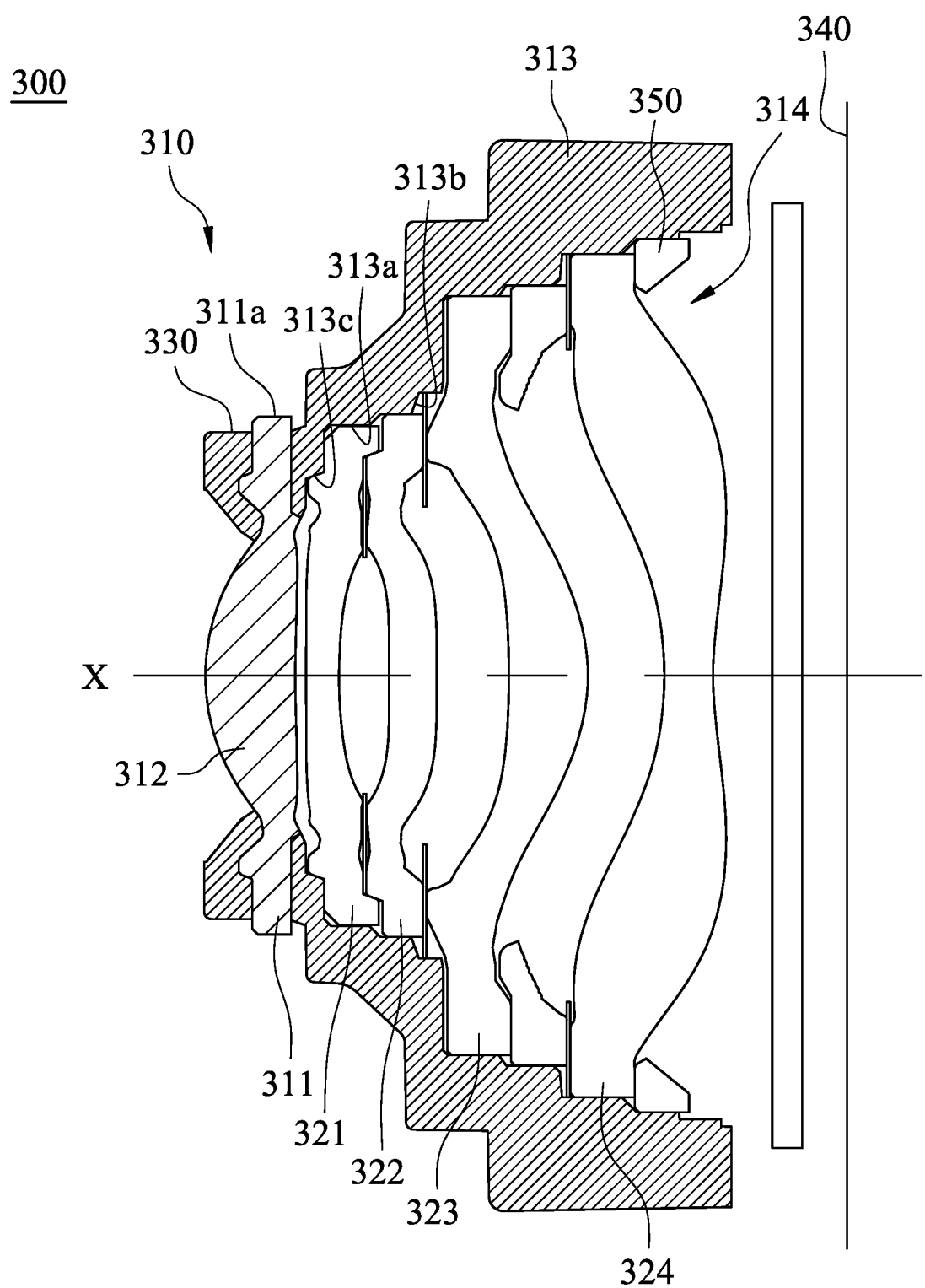
FIG. 3B is an assembly schematic view of the imaging lens assembly according to the 3rd embodiment of FIG. 3A.

FIG. 3A is a partial exploded view of an imaging lens assembly 300 according to the 3rd embodiment of the present disclosure. FIG. 3B is an assembly schematic view of the imaging lens assembly 300 according to the 3rd embodiment of FIG. 3A. As shown in FIG. 3A and FIG. 3B, the imaging lens assembly 300 includes a dual molded optical element 310, a plurality of imaging lens elements and a light blocking element 330, and an image side of the imaging lens assembly 300 further includes an image surface 340. The imaging lens elements are disposed in the dual molded optical element 310, and the light blocking element 330 is connected to one side of the dual molded optical element 310.

The dual molded optical element 310 has an object-side surface and an image-side surface and includes a light transmitting portion 311 and a light absorbing portion 313. A plastic material of the light transmitting portion 311 and a plastic material of the light absorbing portion 313 are different colors, and the light transmitting portion 311 and the light absorbing portion 313 are formed by a dual-shot injection molded method.

Please refer to FIG. 3C(1), FIG. 3C(2) and FIG. 3C(3), which are respectively a step schematic view of a dual-shot injection molded process of the dual molded optical element 310 according to the 3rd embodiment. As shown in FIG. 3C(1) and FIG. 3C(2), a mold 370 including a fixed side element 371, a movable side element 372 and a sliding element 373 is provided, and a chamber between the fixed side element 371, the movable side element 372 and the sliding element 373 is for perfusing the plastic material of the light absorbing portion 313 so as to form the light absorbing portion 313. As shown in FIG. 3C(3), the movable side element 372 can be replaced with a movable side element 374, and a chamber between the movable side element 374, the sliding element 373 and the fixed side element 371 can be for perfusing the plastic material of the light transmitting portion 311 so as to form the light transmitting portion 311. Therefore, the dual molded optical element 310 can be formed by the dual-shot injection molded method.

In the 3rd embodiment, the light transmitting portion 311 of the dual molded optical element 310 includes an optical effective section 312. The object-side surface and the image-side surface of the optical effective section 312 are both aspheric, and the image-side surface of the optical effective section 312 changes from concave to convex from a paraxial region thereof to a peripheral region thereof.

The light absorbing portion 313 is located on at least one of the object-side surface and the image-side surface of the dual molded optical element 310. In particular, in the 3rd embodiment, the light absorbing portion 313 is only located on the image-side surface of the dual molded optical element 310. The light absorbing portion 313 includes a plurality of parallel inner surface 313a, a plurality of connecting inner surface 313b and a third axial connecting surface 313c, wherein an inner space 314 is defined by the parallel inner surfaces 313a and the connecting inner surfaces 313b. The inner space 314 is gradually increased along an image-side direction of the imaging lens assembly 300. The third axial connecting surface 313c is for connecting to at least one of the imaging lens elements adjacent thereto so as to align a center of the dual molded optical element 300 and a center of the at least one of the imaging lens elements. In particular, in the 3rd embodiment, the third axial connecting surface 313c is connected to a first imaging lens elements 321.

In the imaging lens assembly 300 according to the 3rd embodiment, a number of the imaging lens elements is four, which are a first imaging lens element 321, a second imaging lens element 322, a third imaging lens element 323 and a fourth imaging lens element 324. The first imaging lens element 321, the second imaging lens element 322, the third imaging lens element 323 and the fourth imaging lens element 324 are disposed in the inner space 314 along an optical axis X of the imaging lens assembly 300 and correspond to the optical effective section 312 of the light transmitting portion 311. Furthermore, an optical element, such as a light blocking sheet and a spacer, can be disposed between the imaging lens elements, other optical elements, such as filters, etc., can be disposed between the image surface 340 and the imaging lens elements according to requirements, and there is no reference numbers and descriptions in the 3rd embodiment.

The light blocking element 330 is made of a plastic material and disposed adjacent to the light transmitting portion 311 of the dual molded optical element 310, and the light blocking element 330 has a central opening 331 corresponding to the optical effective section 312 of the light transmitting portion 311. The light transmitting portion 311 further includes a first axial connecting surface 311b, the light blocking element 330 further includes a second axial connecting surface 332, and the first axial connecting surface 311b is connected to the second axial connecting surface 332 so as to align the central opening 331 of the light blocking element 330 and the center of the dual molded optical element 300. Furthermore, the light transmitting portion 311 can further include an outer diameter surface 311a, the light blocking element 330 is disposed on an object side of the light transmitting portion 311. The light blocking element 330 is connected to the first axial connecting surface 311b via the second axial connecting surface 332 and will not cover the outer diameter surface 311a, so that the outer diameter surface 311a of the light transmitting portion 311 is exposed on an outside of the imaging lens assembly 300.

Furthermore, the imaging lens assembly 300 can further include a maintaining element 350, which is directly contacted with at least one of the parallel inner surfaces 313a so as to position the imaging lens elements in the inner space 314.

The data of the aforementioned parameters according to the 3rd embodiment of the present disclosure are listed below, wherein the definitions of these parameters shown below are the same as those stated in the 1st embodiment and will not be described thereto.

| 3rd embodiment | | | |
|---|---|---|---|
| ɸL (mm) | 3.617 | CT (mm) | 0.627 |
| ɸBmax (mm) | 6.2 | H (mm) | 3.6715 |
| ɸL/ɸBmax | 0.58 | CT/H | 0.17 |
| ɸi (mm) | 1.88 | N | 4 |
| ɸbi (mm) | 2.2045 | θ(degrees) | 84.66 |
| ɸi/ɸbi | 0.85 | | |

4th Embodiment

Figure 4A:
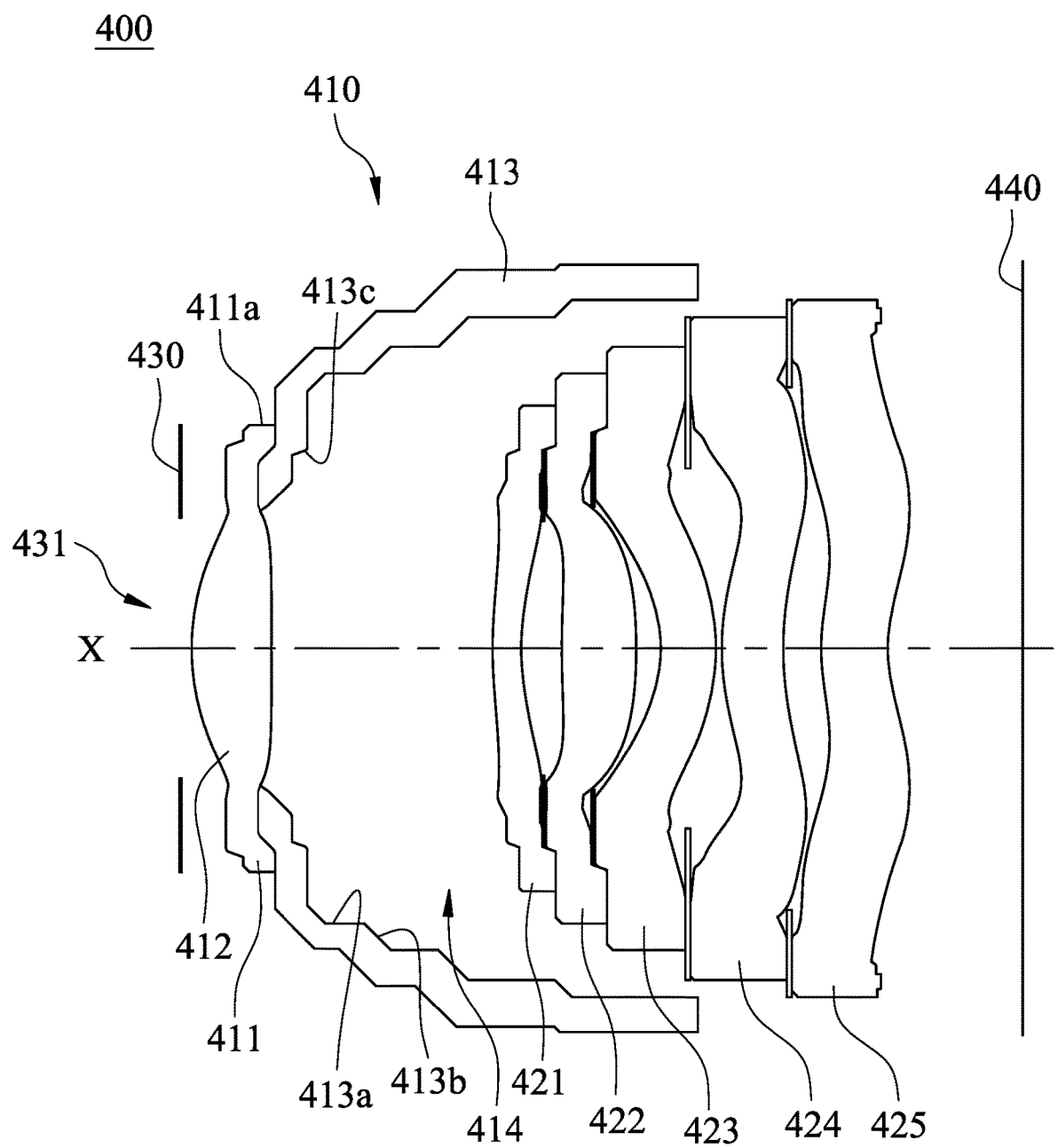
FIG. 4A is a partial exploded view of an imaging lens assembly according to the 4th embodiment of the present disclosure.
Figure 4B:
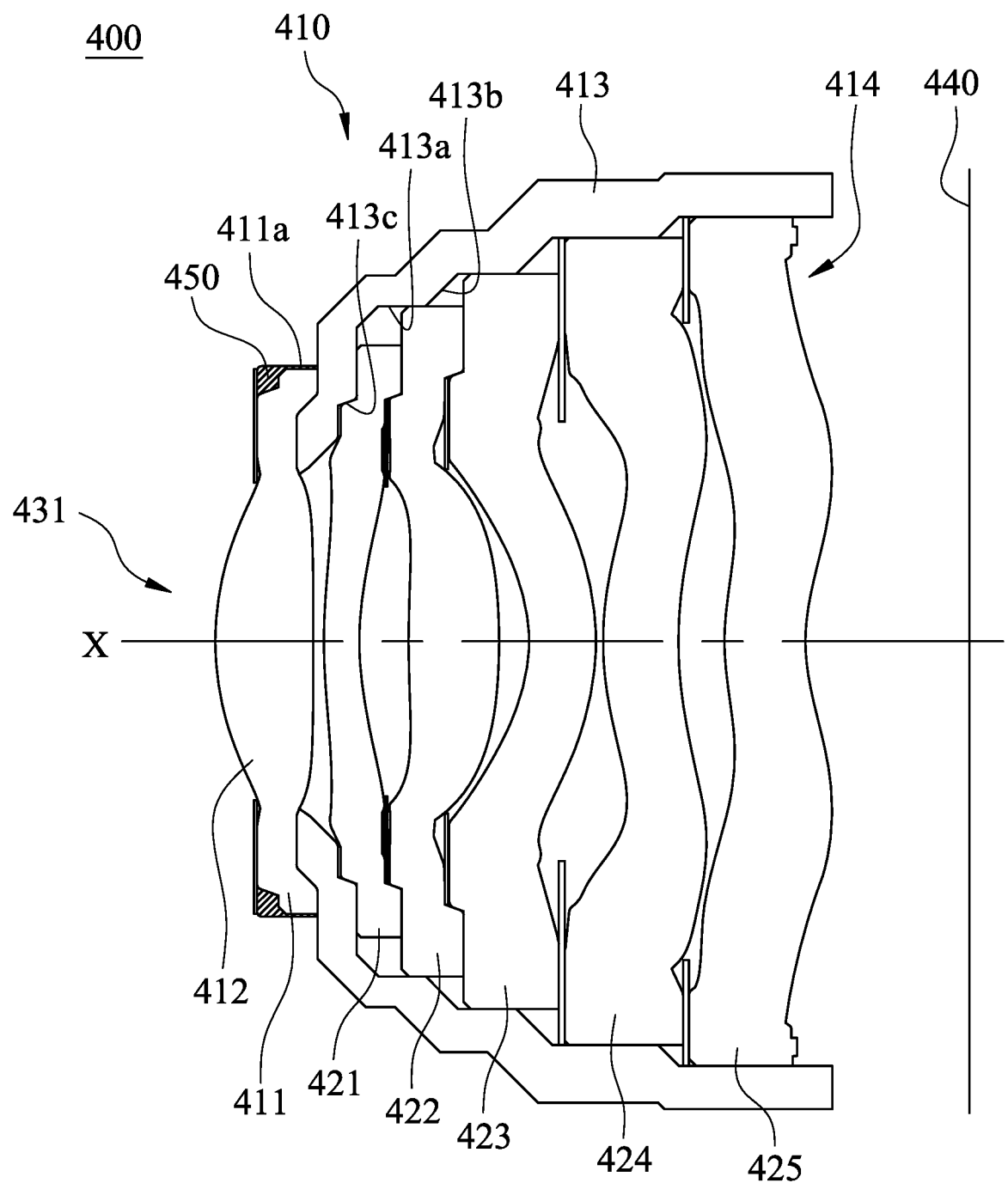
FIG. 4B is an assembly schematic view of the imaging lens assembly according to the 1st embodiment of FIG. 4A.

FIG. 4A is a partial exploded view of an imaging lens assembly 400 according to the 4th embodiment of the present disclosure. FIG. 4B is an assembly schematic view of the imaging lens assembly 400 according to the 1st embodiment of FIG. 4A. As shown in FIG. 4A and FIG. 4B, the imaging lens assembly 400 includes a dual molded optical element 410, a plurality of imaging lens elements and a light blocking thin layer 430, and an image side of the imaging lens assembly 400 further includes an image surface 440. The imaging lens elements are disposed in the dual molded optical element 410, and the light blocking thin layer 430 is connected to one side of the dual molded optical element 410, wherein a shape of the dual molded optical element 410 is stepped.

The dual molded optical element 410 has an object-side surface and an image-side surface and includes a light transmitting portion 411 and a light absorbing portion 413. A plastic material of the light transmitting portion 411 and a plastic material of the light absorbing portion 413 are different colors, and the light transmitting portion 411 and the light absorbing portion 413 are formed by a dual-shot injection molded method.

In the 4th embodiment, the light transmitting portion 411 of the dual molded optical element 410 includes an optical effective section 412, an object-side surface and an image-side surface of the optical effective section 412 are both aspheric, and the image-side surface of the optical effective section 412 changes from concave to convex from a paraxial region thereof to a peripheral region thereof.

The light absorbing portion 413 is located on at least one of the object-side surface and the image-side surface of the dual molded optical element 410. In particular, in the 4th embodiment, the light absorbing portion 413 is only located on the image-side surface of the dual molded optical element 410. The light absorbing portion 413 includes a plurality of parallel inner surfaces 413a, a plurality of connecting inner surfaces 413b and a third axial connecting surface 413c, wherein an inner space 414 is defined by the parallel inner surfaces 413a and the connecting inner surfaces 413b. The inner space 414 is gradually increased along an image-side direction of the imaging lens assembly 400. The third axial connecting surface 413c is for connecting to at least one of the imaging lens elements adjacent thereto so as to align a center of the dual molded optical element 400 and a center of at least one of the imaging lens elements. In particular, in the 4th embodiment, the third axial connecting surface 413c is connected to the first imaging lens elements 421.

In the imaging lens assembly 400 according to the 4th embodiment, a number of the imaging lens elements is five, which are a first imaging lens element 421, a second imaging lens element 422, a third imaging lens element 423, a fourth imaging lens element 424 and a fifth imaging lens element 425. The first imaging lens element 421, the second imaging lens element 422, the third imaging lens element 423, the fourth imaging lens element 424 and the fifth imaging lens element 425 are disposed in the inner space 414 along an optical axis X of the imaging lens assembly 400 and correspond to the optical effective section 412 of the light transmitting portion 411. Furthermore, an optical element, such as a light blocking sheet, can be disposed between the imaging lens elements according to requirements, and there is no reference numbers and descriptions in the 4th embodiment.

The light blocking thin layer 430 is disposed on the light transmitting portion 411 of the dual molded optical element 410 and form a central opening 431 corresponding to the optical effective section 412 of the light transmitting portion 411. In particular, in the 4th embodiment, the light blocking thin layer 430 is a light blocking sheet.

As shown in FIG. 4B, the light transmitting portion 411 can further include an outer diameter surface 411a covered with an opaque coating 450.

Figure 4C:
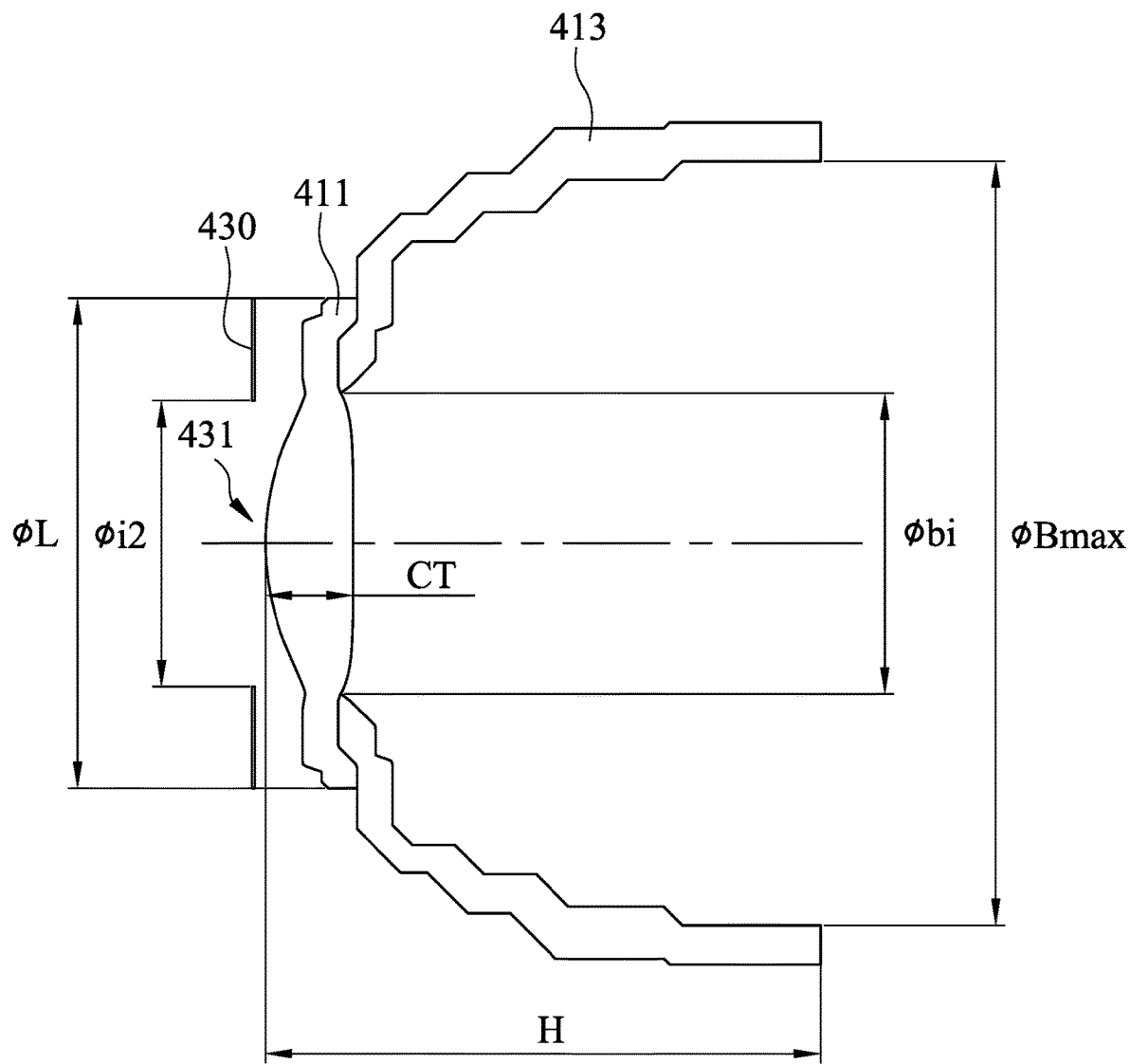
FIG. 4C is a schematic view of related parameters of the dual molded optical element and the light blocking thin layer according to the 4th embodiment of FIG. 4A.

FIG. 4C is a schematic view of related parameters of the dual molded optical element 410 and the light blocking thin layer 430 according to the 4th embodiment of FIG. 4A. As shown in FIG. 4C, a diameter of the outer diameter surface of the light transmitting portion 411 is ɸL, a maximum inner diameter of an inner surface of the light absorbing portion 413 is ɸBmax, a diameter of the central opening of the light blocking thin layer 430 is ɸi2, a minimum inner diameter of the light absorbing portion 413 is ɸbi, a central thickness of the optical effective section 412 is CT, a maximum height of the dual molded optical element 410 parallel to the optical axis X is H, and a number of the imaging lens elements which can be accommodated in the inner space 414 is N. The data of the aforementioned parameters according to the 4th embodiment of the present disclosure are listed below.

| 4th embodiment | | | |
|---|---|---|---|
| ɸL (mm) | 3.78 | CT (mm) | 0.677 |
| ɸBmax (mm) | 5.89 | H (mm) | 4.2737 |
| ɸL/ɸBmax | 0.64 | CT/H | 0.16 |
| ɸi2 (mm) | 2.204 | N | 5 |
| ɸbi (mm) | 2.32 | | |
| ɸi2/ɸbi | 0.95 | | |

5th Embodiment

Figure 5A:
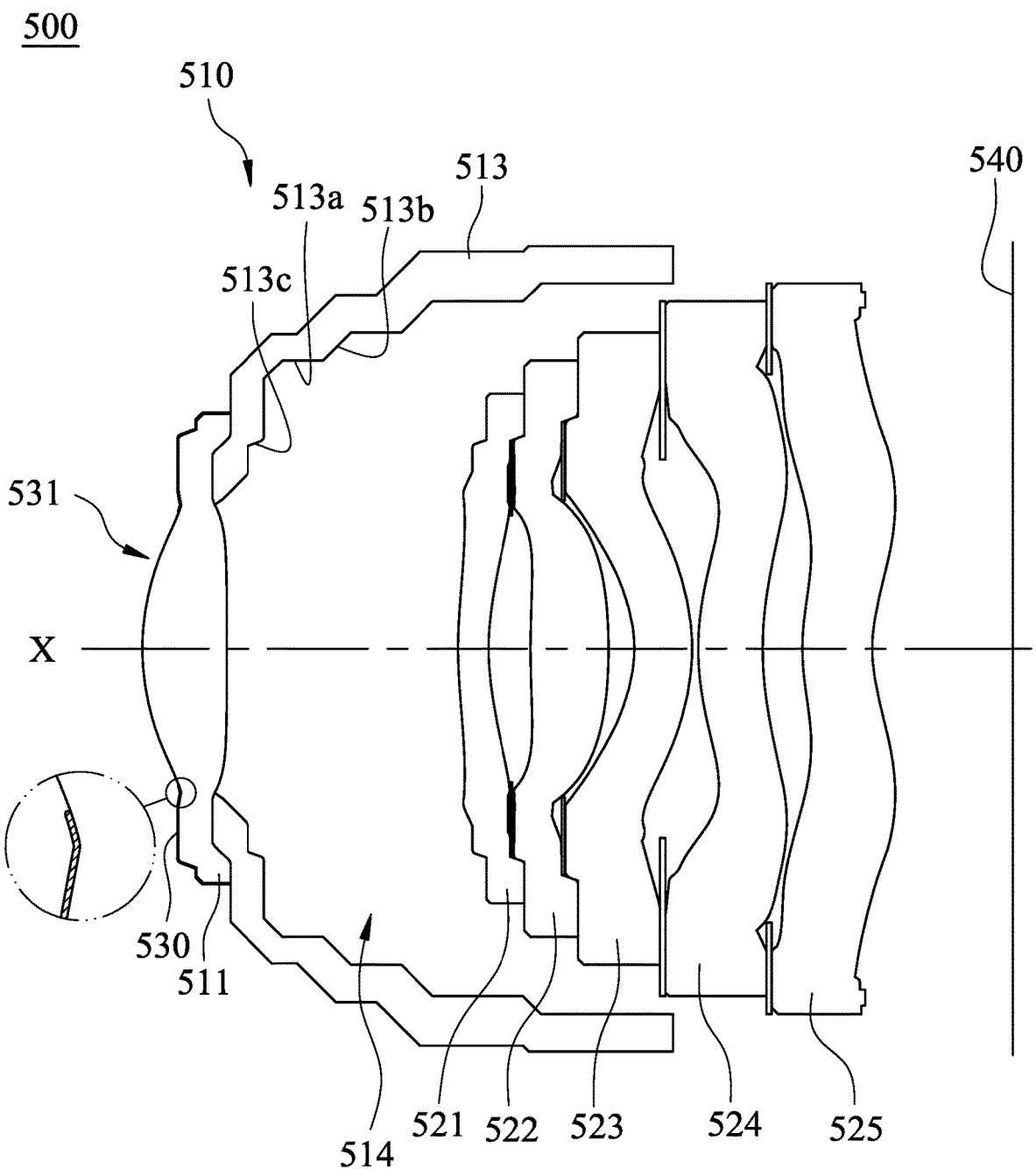
FIG. 5A is a partial exploded view of an imaging lens assembly according to the 5th embodiment of the present disclosure.
Figure 5B:
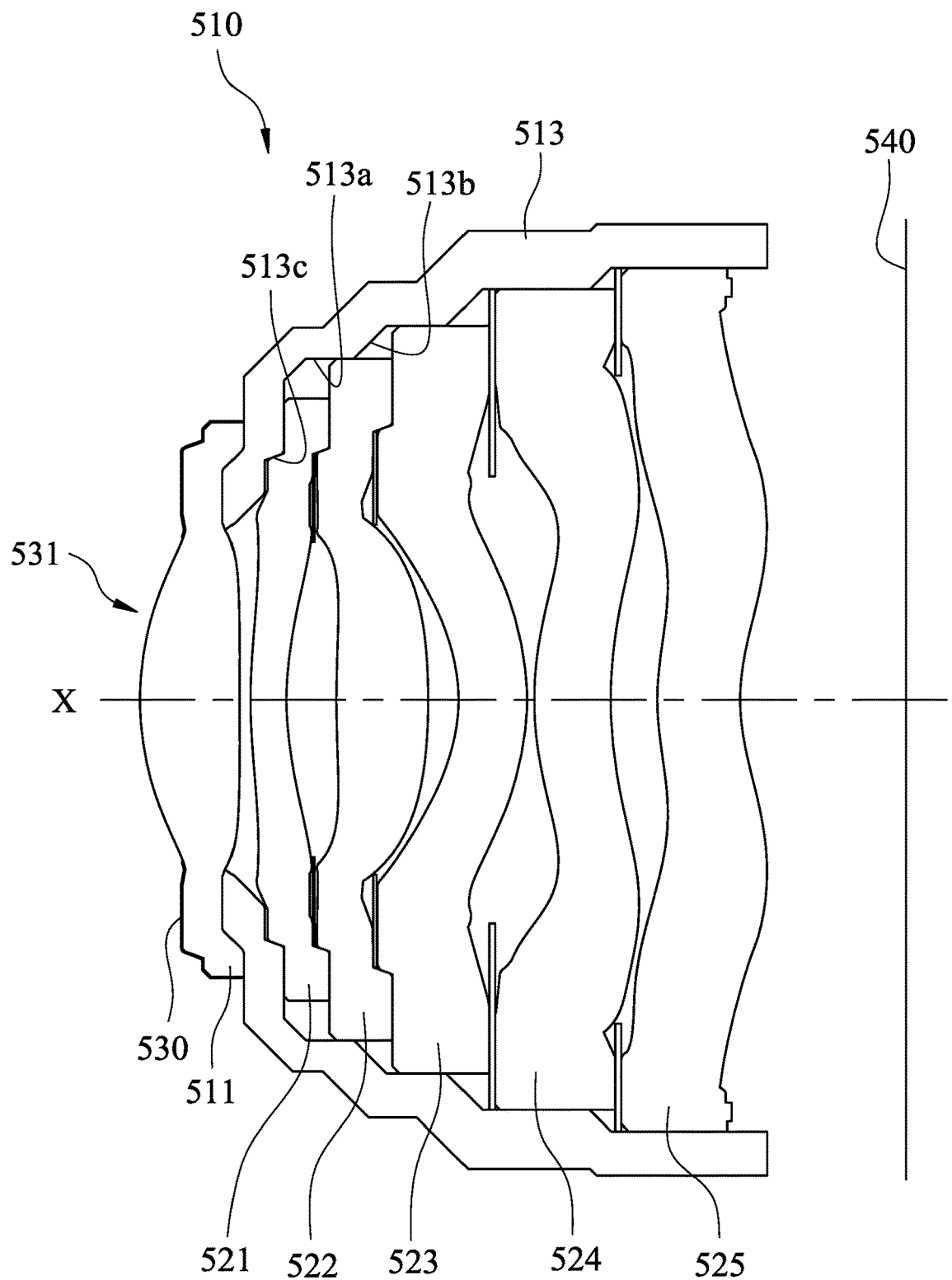
FIG. 5B is an assembly schematic view of the imaging lens assembly according to the 5th embodiment of FIG. 5A.

FIG. 5A is a partial exploded view of an imaging lens assembly 500 according to the 5th embodiment of the present disclosure. FIG. 5B is an assembly schematic view of the imaging lens assembly 500 according to the 5th embodiment of FIG. 5A. As shown in FIG. 5A and FIG. 5B, the imaging lens assembly 500 includes a dual molded optical element 510, a plurality of imaging lens elements and a light blocking thin layer 530, and an image side of the imaging lens assembly 500 further includes an image surface 540. The imaging lens elements are disposed in the dual molded optical element 510, and the light blocking thin layer 530 is connected to one side of the dual molded optical element 510, wherein a shape of the dual molded optical element 510 is stepped.

The dual molded optical element 510 has an object-side surface and an image-side surface and includes a light transmitting portion 511 and a light absorbing portion 513. A plastic material of the light transmitting portion 511 and a plastic material of the light absorbing portion 513 are different colors, and the light transmitting portion 511 and the light absorbing portion 513 are formed by a dual-shot injection molded method.

In the 5th embodiment, the light transmitting portion 511 of the dual molded optical element 510 includes an optical effective section 512, an object-side surface and an image-side surface of the optical effective section 512 are both aspheric, and the image-side surface of the optical effective section 512 changes from concave to convex from a paraxial region thereof to a peripheral region thereof.

The light absorbing portion 513 is located on at least one of the object-side surface and the image-side surface of the dual molded optical element 510. In particular, in the 5th embodiment, the light absorbing portion 513 is only located on the image-side surface of the dual molded optical element 510. The light absorbing portion 513 includes a plurality of parallel inner surfaces 513a, a plurality of connecting inner surfaces 513b and a third axial connecting surface 513c, wherein an inner space 514 is defined by the parallel inner surfaces 513a and the connecting inner surfaces 513b. The inner space 514 is gradually increased along an image-side direction of the imaging lens assembly 500. The third axial connecting surface 513c is for connecting to at least one of the imaging lens elements adjacent thereto so as to align a center of the dual molded optical element 500 and a center of the at least one of the imaging lens elements. In particular, in the 5th embodiment, the third axial connecting surface 513c is connected to the first imaging lens elements 521.

In the imaging lens assembly 500 according to the 4th embodiment, a number of the imaging lens elements is five, which are a first imaging lens element 521, a second imaging lens element 522, a third imaging lens element 523, a fourth imaging lens element 524 and a fifth imaging lens element 525. The first imaging lens element 521, the second imaging lens element 522, the third imaging lens element 523, the fourth imaging lens element 524 and the fifth imaging lens element 525 are disposed in the inner space 514 along an optical axis X of the imaging lens assembly 500 and correspond to the optical effective section 512 of the light transmitting portion 511. Furthermore, an optical element, such as a light blocking sheet, can be disposed between the imaging lens elements according to requirements, and there is no reference numbers and descriptions in the 5th embodiment.

The light blocking thin layer 530 is disposed on the light transmitting portion 511 of the dual molded optical element 510 and forms a central opening 531 corresponding to the optical effective section 512 of the light transmitting portion 511. In particular, in the 5th embodiment, the light blocking thin layer 530 is an opaque coating which can be applied on the light transmitting portion 511 by a spraying method.

The data of the aforementioned parameters according to the 5th embodiment of the present disclosure are listed below, wherein the definitions of these parameters shown below are the same as those stated in the 4th embodiment and will not be described thereto.

| 5th embodiment | | | |
|---|---|---|---|
| φL (mm) | 3.78 | CT (mm) | 0.677 |
| φBmax (mm) | 5.89 | H (mm) | 4.2737 |
| φL/φBmax | 0.64 | CT/H | 0.16 |
| φbi (mm) | 2.32 | N | 5 |

6th Embodiment

Figure 6A:
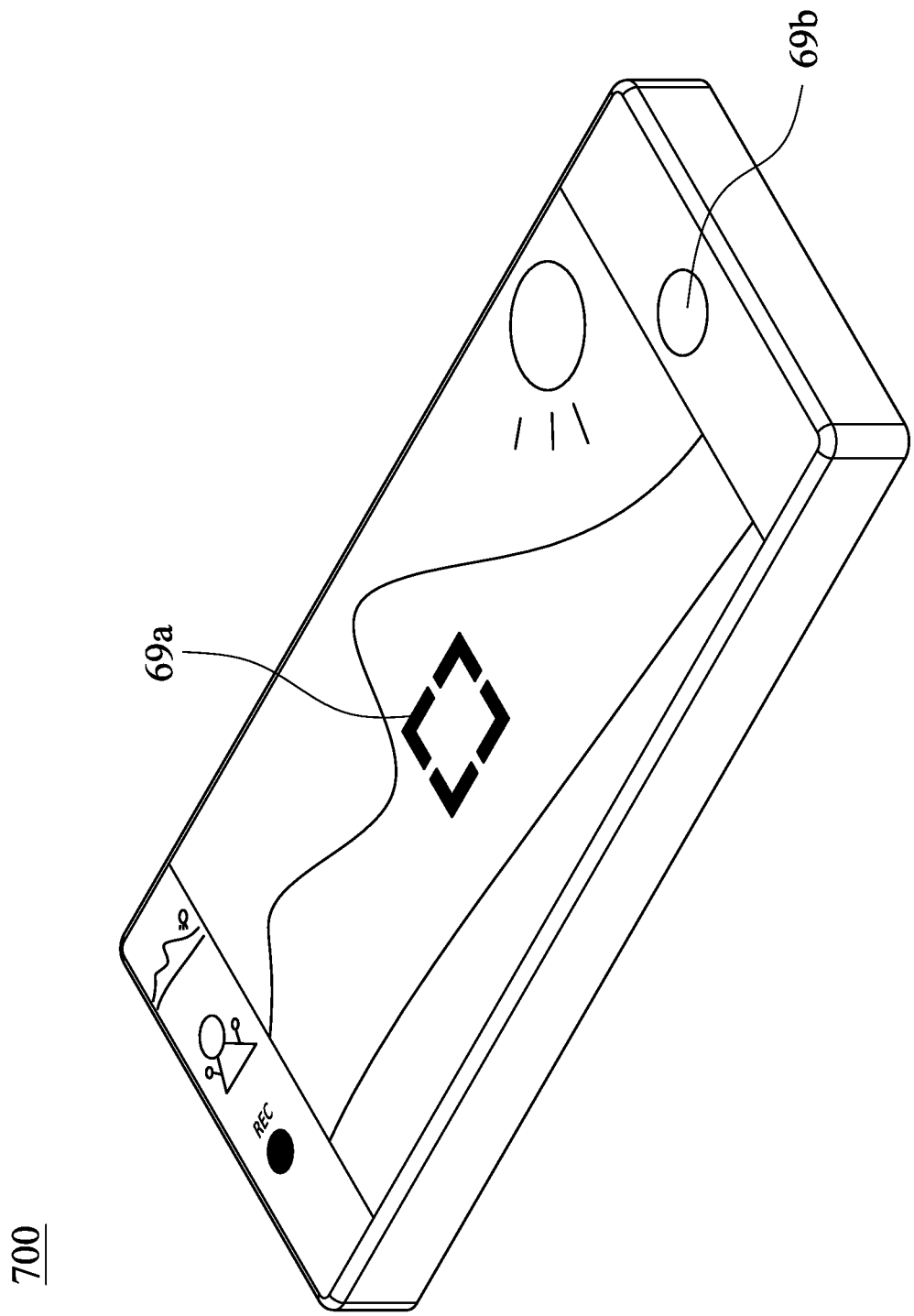
FIG. 6A is a schematic view of an electronic device according to the 6th embodiment of the present disclosure.
Figure 6B:
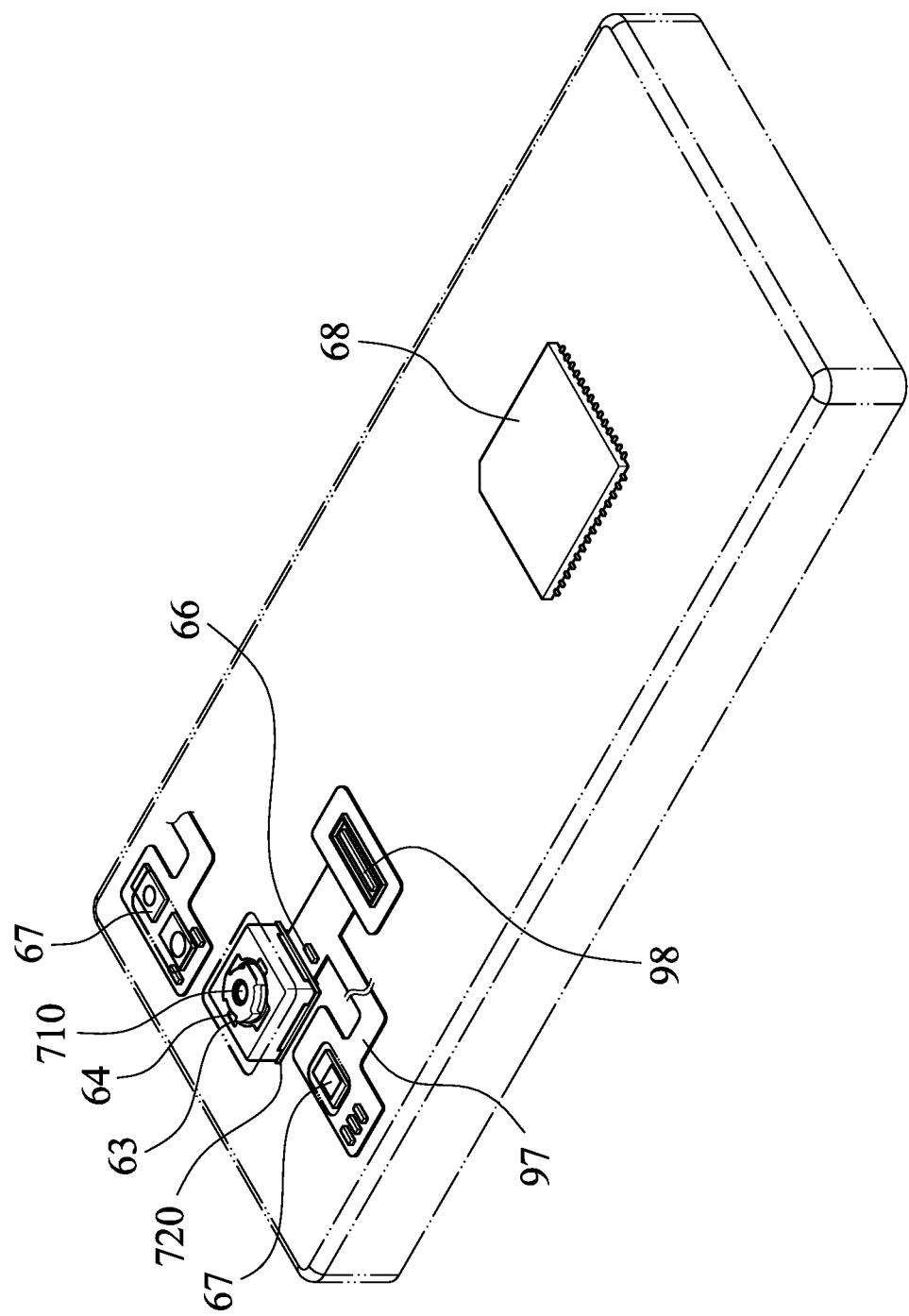
FIG. 6B is another schematic view of the electronic device according to the 6th embodiment of FIG. 6A.

FIG. 6A is a schematic view of an electronic device 700 according to the 6th embodiment of the present disclosure. FIG. 6B is another schematic view of the electronic device 700 according to the 6th embodiment of FIG. 6A. As shown in FIG. 6A and FIG. 6B, the electronic device 700 of the 6th embodiment is a smartphone and includes an imaging lens assembly 710 according to the aforementioned aspects and an image sensor 720, wherein the imaging lens assembly 710 can be the imaging lens assembly according to any one of the aforementioned embodiments (not shown) but not be limited thereto. The image sensor 720 is disposed on an image surface (not shown) of the imaging lens assembly 710. Therefore, marketing demands for mass production and outward appearance of the imaging lens assembly modules on electronic device can be achieved.

Specifically, the user activates the capturing mode by the user interface 69 of the electronic device 700, wherein the user interface 69 of the 6th embodiment can be a touch screen 69a, a button 69b, etc. At this moment, imaging lens assembly 710 collects imaging light on the image sensor 720 and outputs electronic signals associated with images to an image signal processor (ISP) 68.

Figure 6C:
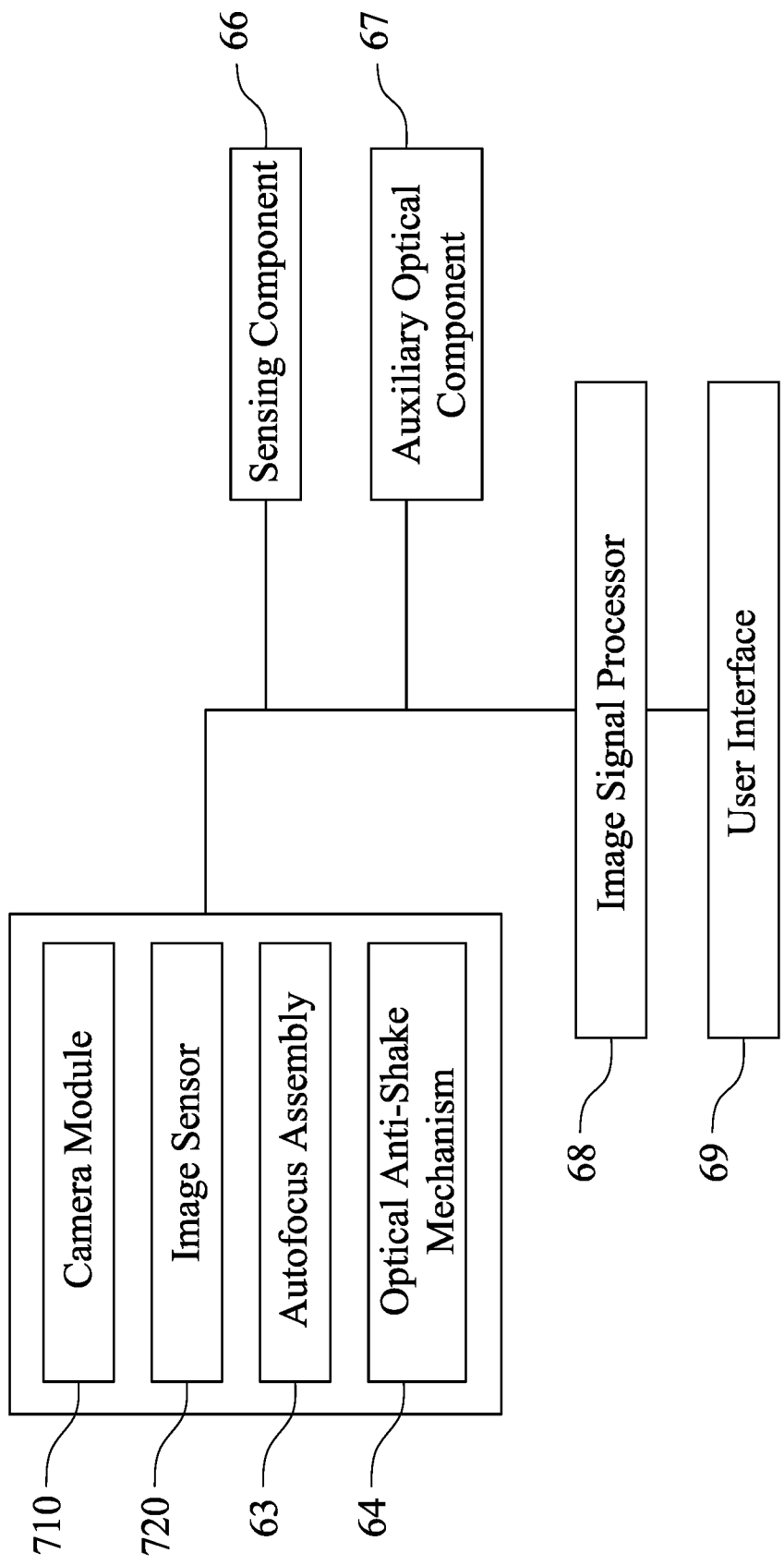
FIG. 6C is a block diagram of the electronic device according to the 6th embodiment.

FIG. 6C is a block diagram of the electronic device 700 according to the 6th embodiment, in particular, the camera block diagram of the electronic device 700. As shown in FIG. 6A to FIG. 6C, the electronic device 700 can further include autofocus assembly 63 and an optical anti-shake mechanism 64 in response to the camera specification of the electronic device 700. Moreover, the electronic device 700 can further include at least one auxiliary optical component 67 and at least one sensing component 66. The auxiliary optical component 67 can be flash modules, infrared distance measurement components, laser focus modules and modules for compensating for color temperatures. The sensing component 66 can have functions for sensing physical momentum and kinetic energies, such as an accelerator, a gyroscope, and a hall effect element, so as to sense shaking or jitters applied by hands of the user or external environments, thus the autofocus assembly 63 and the optical anti-shake mechanism 64 disposed on the electronic device 700 can function to obtain great image quality and facilitate the electronic device 700 according to the present disclosure to have a capturing function with multiple modes, such as taking optimized selfies, high dynamic range (HDR) with a low light source, 4K resolution recording, etc. Furthermore, the user can visually see the captured image of the camera through the touch screen 69a and manually operate the view finding range on the touch screen 69a to achieve the auto focus function of what you see is what you get.

Furthermore, as shown in FIG. 6B, the imaging lens assembly 710, the image sensor 720, the autofocus assembly 63, the optical anti-shake mechanism 64, the sensing component 66 and the auxiliary optical component 67 can be disposed on a flexible printed circuit board (FPC) 97 and electrically connected with the associated elements, such as an image signal processor 68, via connector 98 so as to perform a capturing process. Because the current electronic devices, such as smart phone, have a tendency of being light and thin, the way of disposing the imaging lens assembly and related elements on the flexible printed circuit board and then integrating the circuit into the main board of the electronic device via the connector can satisfy the mechanical design of the limited space inside the electronic device and the layout requirements, and obtain more margins. The auto focus function of the imaging lens assembly can be controlled more flexibly via the touch screen of the electronic device. In the 6th embodiment, the electronic device 700 includes a plurality of sensing components 66 and a plurality of auxiliary optical components 67, the sensing components 66 and the auxiliary optical components 67 are disposed on the flexible printed circuit board 77 and at least one other flexible printed circuit board (reference number is not shown) and electrically connected with the associated elements, such as the image signal processor 68, by corresponding connectors so as to perform a capturing process. In other embodiments (not shown), the image sensor and the auxiliary optical component can also be disposed on the main board of the electronic device or carrier boards in other forms according to requirements of the mechanical design and the circuit layout.

Moreover, the electronic device 700 can further include, but not be limited to, a display, a control unit, a storage unit, a random-access memory (RAM), a read-only memory (ROM), or the combination thereof.

7th Embodiment

Figure 7:
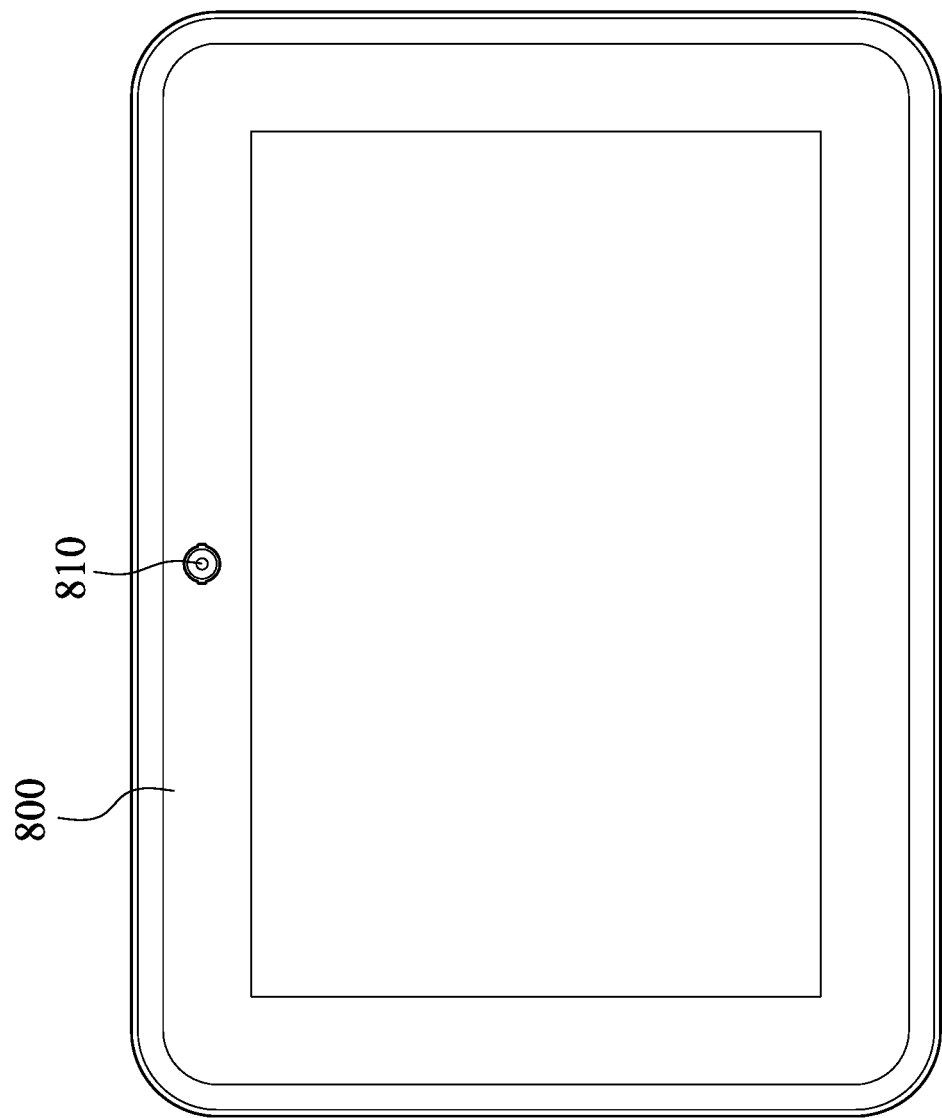
FIG. 7 is a schematic view of an electronic device according to the 7th embodiment of the present disclosure.

FIG. 7 is a schematic view of an electronic device 800 according to the 7th embodiment of the present disclosure. The electronic device 800 of the 7th embodiment is a tablet, and the electronic device 800 include an imaging lens assembly 810 according the present disclosure and an image sensor (not shown), wherein the image sensor is disposed on an image surface of the imaging lens assembly 810 (not shown).

8th Embodiment

Figure 8:
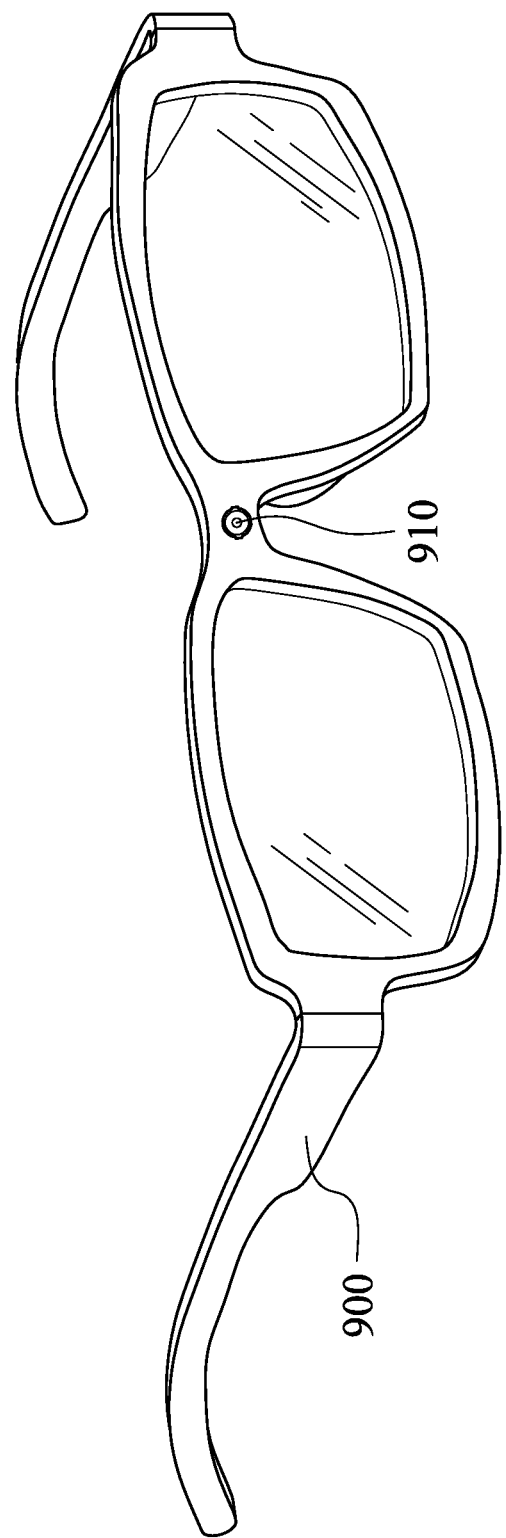
FIG. 8 is a schematic view of an electronic device according to the 8th embodiment of the present disclosure.

FIG. 8 is a schematic view of an electronic device 900 according to the 8th embodiment of the present disclosure. The electronic device 900 of the 8th embodiment is a wearable device, and the electronic device 900 includes a imaging lens assembly 910 according to the present disclosure and an image sensor (not shown), wherein the image sensor is disposed on an image surface of the imaging lens assembly 910 (not shown).

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
 a dual molded optical element having an object-side surface and an image-side surface, comprising:
 a light transmitting portion comprising an optical effective section; and
 a light absorbing portion located on at least one of the object-side surface and the image-side surface of the dual molded optical element, and a plastic material of the light absorbing portion and a plastic material of the light transmitting portion are different colors, wherein the light absorbing portion comprises a plurality of parallel inner surfaces and a plurality of connecting inner surfaces, and an inner space is defined by the parallel inner surfaces and the connecting inner surfaces;
 a plurality of imaging lens elements disposed in the inner space along an optical axis of the imaging lens assembly and corresponding to the optical effective section of the light transmitting portion; and
 a light blocking element disposed adjacent to the light transmitting portion of the dual molded optical element, wherein the light blocking element has a central opening corresponding to the optical effective section of the light transmitting portion;
 wherein the light transmitting portion further comprises an outer diameter surface, the outer diameter surface of the light transmitting portion is exposed on an outside of the inner space, and a diameter of one of the parallel inner surfaces within the inner space is larger than a diameter of the outer diameter surface of the light transmitting portion.

2. The imaging lens assembly of claim 1, wherein the light transmitting portion and the light absorbing portion of the dual molded optical element are formed by a dual-shot injection molded method.

3. The imaging lens assembly of claim 2, wherein the light blocking element is made of a plastic material;
 wherein the light transmitting portion further comprises a first axial connecting surface, the light blocking element further comprises a second axial connecting surface, the first axial connecting surface is connected to the second axial connecting surface so as to align the central opening of the light blocking element and a center of the dual molded optical element.

4. The imaging lens assembly of claim 3, wherein a diameter of the central opening of the light blocking element is $\Phi i$, a minimum inner diameter of the light absorbing portion is $\Phi bi$, and the following condition is satisfied:

$$0.70 < \Phi i/\Phi bi < 1.43.$$

5. The imaging lens assembly of claim 2, wherein the light absorbing portion further comprises a third axial connecting surface for connecting to at least one of the imaging lens elements adjacent thereto so as to align a center of the dual molded optical element and a center of the at least one of the imaging lens elements.

6. The imaging lens assembly of claim 1, wherein the diameter of the outer diameter surface of the light transmitting portion is $\Phi L$, a maximum inner diameter of an inner surface of the light absorbing portion within the inner space is $\Phi Bmax$, and the following condition is satisfied:

$$0.35 < \Phi L/\Phi Bmax < 0.75.$$

7. The imaging lens assembly of claim 2, wherein a number of the imaging lens elements which can be accommodated in the inner space is N, and the following condition is satisfied:

$3 < N \leq 7$.

8. The imaging lens assembly of claim 2, wherein the optical effective section comprises at least one aspheric surface.

9. The imaging lens assembly of claim 8, wherein at least one of an object-side surface and an image-side surface of the optical effective section changes from concave to convex from a paraxial region thereof to a peripheral region thereof.

10. The imaging lens assembly of claim 2, wherein the central opening of the light blocking element is surrounded by a tip structure, an angle of the tip structure is θ, and the following condition is satisfied:

45 degrees<θ<120 degrees.

11. The imaging lens assembly of claim 10, wherein the tip structure comprises an object-side terminal surface and an image-side terminal surface, the object-side terminal surface is linearly shrunk from an object side to an image side of the imaging lens assembly, and the image-side terminal surface is linearly shrunk from the image side to the object side of the imaging lens assembly.

12. The imaging lens assembly of claim 1, wherein the inner space is gradually increased along at least one of an object-side direction and an image-side direction of the imaging lens assembly.

13. The imaging lens assembly of claim 1, further comprising:
a maintaining element directly contacted with at least one of the parallel inner surfaces so as to position the imaging lens elements in the inner space.

14. An electronic device, comprising:
the imaging lens assembly of claim 1; and
an image sensor disposed on an image surface of the imaging lens assembly.

15. An imaging lens assembly, comprising:
a dual molded optical element having an object-side surface and an image-side surface, comprising:
a light transmitting portion comprising an optical effective section; and
a light absorbing portion, wherein a plastic material of the light absorbing portion and a plastic material of the light transmitting portion are different colors, the light absorbing portion comprises a first light absorbing portion and a second light absorbing portion, and the first light absorbing portion and the second light absorbing portion are disposed on the object-side surface and the image-side surface of the dual molded optical element, respectively, and separated by the light transmitting portion, wherein the first light absorbing portion is a light blocking area and has a central opening, the second light absorbing portion extends to a direction away from the light transmitting portion and comprises a plurality of parallel inner surfaces and a plurality of connecting inner surfaces, and an inner space is defined by the parallel inner surfaces and the connecting inner surfaces; and
a plurality of imaging lens elements disposed in the inner space along an optical axis of the imaging lens assembly and corresponding to the optical effective section of the light transmitting portion;
wherein the light transmitting portion further comprises an outer diameter surface, the outer diameter surface of the light transmitting portion is exposed on an outside of the inner space, and a diameter of one of the parallel inner surfaces within the inner space is larger than a diameter of the outer diameter surface of the light transmitting portion.

16. The imaging lens assembly of claim 15, wherein the light transmitting portion and the light absorbing portion of the dual molded optical element are formed by a dual-shot injection molded method.

17. The imaging lens assembly of claim 15, wherein the second light absorbing portion comprises a third axial connecting surface for connecting to at least one of the imaging lens elements adjacent thereto so as to align a center of the dual molded optical element and a center of the at least one of the imaging lens elements.

18. The imaging lens assembly of claim 16, wherein the central opening of the first light absorbing portion is surrounded by a tip structure, an angle of the tip structure is θ, and the following condition is satisfied:

45 degrees<θ<120 degrees.

19. An imaging lens assembly, comprising:
a dual molded optical element having an object-side surface and an image-side surface, comprising:
a light transmitting portion comprising an optical effective section; and
a light absorbing portion located on at least one of the object-side surface and the image-side surface of the dual molded optical element, wherein a plastic material of the light absorbing portion and a plastic material of the light transmitting portion are different colors, the light absorbing portion comprises a plurality of parallel inner surfaces and a plurality of connecting inner surfaces, and an inner space is defined by the parallel inner surfaces and the connecting inner surfaces;
a plurality of imaging lens elements disposed in the inner space along an optical axis of the imaging lens assembly and corresponding to the optical effective section of the light transmitting portion; and
a light blocking thin layer disposed on the light transmitting portion of the dual molded optical element and forming a central opening, and the central opening corresponding to the optical effective section of the light transmitting portion;
wherein the light transmitting portion further comprises an outer diameter surface, the outer diameter surface of the light transmitting portion is exposed on an outside of the inner space, and a diameter of one of the parallel inner surfaces within the inner space is larger than a diameter of the outer diameter surface of the light transmitting portion.

20. The imaging lens assembly of claim 19, wherein the light transmitting portion and the light absorbing portion of the dual molded optical element are formed by a dual-shot injection molded method.

21. The imaging lens assembly of claim 20, wherein the light absorbing portion further comprises a third axial connecting surface for connecting to at least one of the imaging lens elements adjacent thereto so as to align a center of the dual molded optical element and a center of the at least one of the imaging lens elements.

22. The imaging lens assembly of claim 20, wherein the outer diameter surface of the light transmitting portion is covered with an opaque coating.

23. The imaging lens assembly of claim 20, wherein a number of the imaging lens elements which can be accommodated in the inner space is N, and the following condition is satisfied:

$$3 < N \leq 7.$$

24. The imaging lens assembly of claim 20, wherein the light absorbing portion is located on only one of the object-side surface and the image-side surface of the dual molded optical element.

25. The imaging lens assembly of claim 20, wherein the inner space is gradually increased along at least one of an object-side direction and an image-side direction of the imaging lens assembly.

26. The imaging lens assembly of claim 20, wherein a shape of the dual molded optical element is stepped.

* * * * *